US009750107B2

(12) United States Patent
Zhu et al.

(10) Patent No.: US 9,750,107 B2
(45) Date of Patent: Aug. 29, 2017

(54) SYSTEMS AND METHODS FOR INTELLIGENT DIMMING CONTROL USING TIRAC DIMMERS

(71) Applicant: ON-BRIGHT ELECTRONICS (SHANGHAI) CO., LTD., Shanghai (CN)

(72) Inventors: Liqiang Zhu, Shanghai (CN); Jiqing Yang, Shanghai (CN); Zhuoyan Li, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 231 days.

(21) Appl. No.: 14/532,811

(22) Filed: Nov. 4, 2014

(65) Prior Publication Data

US 2016/0014861 A1    Jan. 14, 2016

Related U.S. Application Data

(63) Continuation of application No. 14/451,656, filed on Aug. 5, 2014, now Pat. No. 9,585,222.

(30) Foreign Application Priority Data

Jul. 8, 2014    (CN) .......................... 2014 1 0322612

(51) Int. Cl.
*H05B 33/08* (2006.01)
*H05B 39/04* (2006.01)

(52) U.S. Cl.
CPC ....... *H05B 33/0887* (2013.01); *H05B 39/044* (2013.01); *Y02B 20/146* (2013.01)

(58) Field of Classification Search
None
See application file for complete search history.

(56) References Cited

U.S. PATENT DOCUMENTS 3,803,452 A    4/1974 Goldschmied
4,253,045 A    2/1981 Weber
(Continued)

FOREIGN PATENT DOCUMENTS

CN    1448005 A    10/2003
CN    101657057 A    2/2010
(Continued)

OTHER PUBLICATIONS

United States Patent and Trademark Office, Office Action mailed Sep. 6, 2016, in U.S. Appl. No. 14/459,167.
(Continued)

*Primary Examiner* — Crystal L Hammond
(74) *Attorney, Agent, or Firm* — Jones Day

(57) ABSTRACT

Systems and methods for dimming control using TRIAC dimmers are provided. An example apparatus for a power conversion system includes: a process-and-drive component configured to receive an input signal and output a drive signal to a switch to affect a current that flows through a primary winding of a power conversion system. The input signal includes a first pulse associated with a first input period and a second pulse associated with a second input period. The drive signal is associated with a first modulation period for the first input period and a second modulation period for the second input period. The process-and-drive component is further configured to: determine the first modulation period for the first input period; change the drive signal between a first logic level and a second logic level at a modulation frequency during the first modulation period; determine the second modulation period for the second input period.

12 Claims, 17 Drawing Sheets

(56) References Cited

U.S. PATENT DOCUMENTS

| | | |
|---|---|---|
| 5,144,205 A | 9/1992 | Motto et al. |
| 5,249,298 A | 9/1993 | Bolan et al. |
| 5,949,197 A | 9/1999 | Kastner |
| 6,218,788 B1 | 4/2001 | Chen et al. |
| 6,229,271 B1 | 5/2001 | Liu |
| 6,278,245 B1 | 8/2001 | Li et al. |
| 7,038,399 B2 | 5/2006 | Lys et al. |
| 7,649,327 B2 | 1/2010 | Peng |
| 7,880,400 B2 | 2/2011 | Zhou et al. |
| 7,944,153 B2 | 5/2011 | Greenfeld |
| 8,134,302 B2 | 3/2012 | Yang et al. |
| 8,278,832 B2 | 10/2012 | Hung et al. |
| 8,378,583 B2 | 2/2013 | Hying et al. |
| 8,378,588 B2 | 2/2013 | Kuo et al. |
| 8,378,589 B2 | 2/2013 | Kuo et al. |
| 8,432,438 B2 | 4/2013 | Ryan et al. |
| 8,497,637 B2 | 7/2013 | Liu |
| 8,644,041 B2 | 2/2014 | Pansier |
| 8,698,419 B2 | 4/2014 | Yan et al. |
| 8,890,440 B2 | 11/2014 | Yan et al. |
| 8,941,324 B2 | 1/2015 | Zhou et al. |
| 9,030,122 B2 | 5/2015 | Yan et al. |
| 9,220,136 B2 | 12/2015 | Zhang |
| 9,301,349 B2 | 3/2016 | Zhu et al. |
| 9,408,269 B2 | 8/2016 | Zhu et al. |
| 9,414,455 B2 | 8/2016 | Zhou et al. |
| 9,480,118 B2 | 10/2016 | Liao et al. |
| 9,554,432 B2 | 1/2017 | Zhu et al. |
| 2006/0022648 A1 | 2/2006 | Ben-Yaakov et al. |
| 2007/0182699 A1 | 8/2007 | Ha et al. |
| 2007/0267978 A1 | 11/2007 | Shteynberg et al. |
| 2008/0224629 A1 | 9/2008 | Melanson |
| 2008/0278092 A1 | 11/2008 | Lys et al. |
| 2009/0021469 A1 | 1/2009 | Yeo et al. |
| 2009/0251059 A1 | 10/2009 | Veltman |
| 2010/0156319 A1 | 6/2010 | Melanson |
| 2010/0164406 A1 | 7/2010 | Kost et al. |
| 2010/0176733 A1 | 7/2010 | King |
| 2010/0207536 A1 | 8/2010 | Burdalski |
| 2010/0213859 A1 | 8/2010 | Shteynberg |
| 2010/0231136 A1 | 9/2010 | Reisenauer et al. |
| 2011/0037399 A1 | 2/2011 | Hung et al. |
| 2011/0080110 A1 | 4/2011 | Nuhfer et al. |
| 2011/0080111 A1 | 4/2011 | Nuhfer et al. |
| 2011/0121744 A1 | 5/2011 | Salvestrini |
| 2011/0121754 A1 | 5/2011 | Shteynberg |
| 2011/0227490 A1 | 9/2011 | Huynh |
| 2011/0260619 A1 | 10/2011 | Sadwick |
| 2011/0285301 A1 | 11/2011 | Kuang et al. |
| 2011/0291583 A1 | 12/2011 | Shen |
| 2011/0309759 A1 | 12/2011 | Shteynberg |
| 2012/0032604 A1 | 2/2012 | Hontele |
| 2012/0146526 A1 | 6/2012 | Lam et al. |
| 2012/0181944 A1 | 7/2012 | Jacobs et al. |
| 2012/0181946 A1 | 7/2012 | Melanson |
| 2012/0187857 A1 | 7/2012 | Ulmann et al. |
| 2012/0268031 A1 | 10/2012 | Zhou et al. |
| 2012/0299500 A1 | 11/2012 | Sadwick |
| 2012/0299501 A1 | 11/2012 | Kost et al. |
| 2012/0326616 A1 | 12/2012 | Sumitani et al. |
| 2013/0009561 A1 | 1/2013 | Briggs |
| 2013/0020965 A1 | 1/2013 | Kang et al. |
| 2013/0026942 A1 | 1/2013 | Ryan et al. |
| 2013/0026945 A1 | 1/2013 | Ganick et al. |
| 2013/0027528 A1 | 1/2013 | Staats et al. |
| 2013/0063047 A1 | 3/2013 | Veskovic |
| 2013/0175931 A1 | 7/2013 | Sadwick |
| 2013/0181630 A1 | 7/2013 | Taipale et al. |
| 2013/0193879 A1 | 8/2013 | Sadwick |
| 2013/0194848 A1 | 8/2013 | Bernardinis et al. |
| 2013/0215655 A1 | 8/2013 | Yang et al. |
| 2013/0223107 A1 | 8/2013 | Zhang et al. |
| 2013/0241427 A1 | 9/2013 | Kesterson et al. |
| 2013/0241428 A1 | 9/2013 | Takeda |
| 2013/0242622 A1 | 9/2013 | Peng |
| 2013/0307431 A1 | 11/2013 | Zhu et al. |
| 2013/0307434 A1 | 11/2013 | Zhang |
| 2014/0029315 A1 | 1/2014 | Zhang et al. |
| 2014/0063857 A1 | 3/2014 | Peng |
| 2014/0078790 A1 | 3/2014 | Lin et al. |
| 2014/0103829 A1 | 4/2014 | Kang |
| 2014/0132172 A1 | 5/2014 | Zhu et al. |
| 2014/0160809 A1 | 6/2014 | Lin et al. |
| 2014/0265935 A1 | 9/2014 | Sadwick |
| 2014/0346973 A1 | 11/2014 | Zhu et al. |
| 2014/0354170 A1 | 12/2014 | Gredler |
| 2015/0077009 A1 | 3/2015 | Kunimatsu |
| 2015/0091470 A1 | 4/2015 | Zhou et al. |
| 2015/0312982 A1 | 10/2015 | Melanson |
| 2015/0312988 A1 | 10/2015 | Liao et al. |
| 2015/0359054 A1* | 12/2015 | Lin .................. H05B 33/0815 315/206 |
| 2016/0014865 A1 | 1/2016 | Zhu et al. |
| 2016/0037604 A1 | 2/2016 | Zhu et al. |
| 2016/0338163 A1 | 11/2016 | Zhu et al. |

FOREIGN PATENT DOCUMENTS

| | | |
|---|---|---|
| CN | 101868090 | 10/2010 |
| CN | 101896022 A | 11/2010 |
| CN | 101917804 A | 12/2010 |
| CN | 101998734 A | 3/2011 |
| CN | 102014551 A | 4/2011 |
| CN | 102056378 A | 5/2011 |
| CN | 102209412 A | 10/2011 |
| CN | 102300375 A | 12/2011 |
| CN | 102347607 | 2/2012 |
| CN | 102387634 A | 3/2012 |
| CN | 103004290 | 3/2012 |
| CN | 102474953 | 5/2012 |
| CN | 102497706 | 6/2012 |
| CN | 202353859 U | 7/2012 |
| CN | 102695330 A | 9/2012 |
| CN | 102791056 A | 11/2012 |
| CN | 102843836 A | 12/2012 |
| CN | 202632722 U | 12/2012 |
| CN | 102870497 | 1/2013 |
| CN | 102946674 A | 2/2013 |
| CN | 103024994 A | 4/2013 |
| CN | 103313472 | 9/2013 |
| CN | 103369802 A | 10/2013 |
| CN | 103379712 A | 10/2013 |
| CN | 103547014 | 1/2014 |
| CN | 103716934 | 4/2014 |
| CN | 103858524 | 6/2014 |
| CN | 103945614 A | 7/2014 |
| EP | 2403318 A1 | 1/2012 |
| JP | 2008-010152 A | 1/2008 |
| JP | 2011-249328 A | 12/2011 |
| TW | 201215228 A1 | 9/2010 |
| TW | 201125441 A | 7/2011 |
| TW | 201132241 | 9/2011 |
| TW | 201143530 A | 12/2011 |
| TW | 201146087 A1 | 12/2011 |
| TW | 201208463 A1 | 2/2012 |
| TW | 201208481 A1 | 2/2012 |
| TW | 201208486 | 2/2012 |
| TW | I 387396 | 2/2013 |
| TW | 201322825 A | 6/2013 |
| TW | 201342987 | 10/2013 |
| TW | I 423732 | 1/2014 |
| TW | 201412189 A | 3/2014 |
| TW | M477115 | 4/2014 |
| TW | 201417626 A | 5/2014 |
| TW | 201417631 | 5/2014 |
| TW | 201422045 | 6/2014 |
| TW | 201424454 A | 6/2014 |
| TW | I448198 | 8/2014 |

OTHER PUBLICATIONS

United States Patent and Trademark Office, Notice of Allowance mailed Jun. 16, 2016, in U.S. Appl. No. 14/593,734.

(56) References Cited

OTHER PUBLICATIONS

China Patent Office, Office Action mailed Nov. 15, 2014, in Application No. 201210166672.0.
China Patent Office, Office Action mailed Jul. 7, 2014, in Application No. 201210468505.1.
China Patent Office, Office Action mailed Jun. 3, 2014, in Application No. 201110103130.4.
Taiwan Intellectual Property Office, Office Action mailed Jan. 7, 2014, in Application No. 100119272.
Taiwan Intellectual Property Office, Office Action mailed Jun. 9, 2014, in Application No. 101124982.
Taiwan Intellectual Property Office, Office Action mailed Sep. 25, 2014, in Application No. 101148716.
United States Patent and Trademark Office, Notice of Allowanced mailed Apr. 9, 2015, in U.S. Appl. No. 13/527,475.
United States Patent and Trademark Office, Office Action mailed Dec. 2, 2014, in U.S. Appl. No. 13/527,475.
United States Patent and Trademark Office, Office Action mailed Jan. 15, 2015, in U.S. Appl. No. 14/562,432.
China Patent Office, Office Action mailed Sep. 2, 2016, in Application No. 201510103579.9.
United States Patent and Trademark Office, Notice of Allowance mailed Jun. 16, 2015, in U.S. Appl. No. 14/593,734.
United States Patent and Trademark Office, Notice of Allowance mailed Sep. 12, 2016, in U.S. Appl. No. 14/819,200.
China Patent Office, Office Action mailed Jun. 30, 2015, in Application No. 201410171893.6.
China Patent Office, Office Action mailed Aug. 8, 2015, in Application No. 201410172086.6.
United States Patent and Trademark Office, Notice of Allowance mailed May 7, 2015, in U.S. Appl. No. 13/527,475.
United States Patent and Trademark Office, Office Action mailed Jun. 5, 2015, in U.S. Appl. No. 13/710,277.
China Patent Office, Office Action mailed Aug. 28, 2015, in Application No. 201410322602.9.
China Patent Office, Office Action mailed Oct. 19, 2015, in Application No. 201410322612.2.
Taiwan Intellectual Property Office, Office Action mailed Sep. 17, 2015, in Application No. 103127108.
Taiwan Intellectual Property Office, Office Action mailed Sep. 17, 2015, in Application No. 103127620.
United States Patent and Trademark Office, Notice of Allowance mailed Oct. 22, 2015, in U.S. Appl. No. 13/527,475.
United States Patent and Trademark Office, Office Action mailed Aug. 19, 2015, in U.S. Appl. No. 14/562,432.
China Patent Office, Office Action mailed Mar. 2, 2016, in Application No. 201410172086.6.
China Patent Office, Office Action mailed Mar. 3, 2016, in Application No. 201410322612.2.
Taiwan Intellectual Property Office, Office Action mailed Apr. 18, 2016, in Application No. 103140989.
United States Patent and Trademark Office, Notice of Allowance mailed Mar. 7, 2016, in U.S. Appl. No. 13/710,277.
United States Patent and Trademark Office, Notice of Allowance mailed Mar. 30, 2016, in U.S. Appl. No. 14/562,432.
China Patent Office, Office Action mailed Dec. 14, 2015, in Application No. 201210166672.0.
Taiwan Intellectual Property Office, Office Action mailed Nov. 13, 2015, in Application No. 103141628.
United States Patent and Trademark Office, Notice of Allowance mailed Dec. 21, 2015, in U.S. Appl. No. 13/710,277.
United States Patent and Trademark Office, Office Action mailed Jan. 13, 2016, in U.S. Appl. No. 14/451,656.
United States Patent and Trademark Office, Office Action mailed Dec. 17, 2015, in U.S. Appl. No. 14/459,167.
United States Patent and Trademark Office, Notice of Allowance mailed Jan. 21, 2016, in U.S. Appl. No. 14/562,432.
United States Patent and Trademark Office, Office Action mailed Dec. 30, 2015, in U.S. Appl. No. 14/593,734.
United States Patent and Trademark Office, Office Action mailed Dec. 3, 2015, in U.S. Appl. No. 14/819,200.
United States Patent and Trademark Office, Notice of Allowance mailed Oct. 20, 2016, in U.S. Appl. No. 14/451,656.
U.S., Notice of Allowance dated Jul. 13, 2017, in U.S. Appl. No. 15/403,520.
U.S., Office Action dated Jun. 27, 2017, in U.S. Appl. No. 14/459,167.
U.S., Notice of Allowance dated Apr. 21, 2017, in U.S. Appl. No. 15/364,100.
U.S., Office Action dated Apr. 20, 2017, in U.S. Appl. No. 15/263,080.
U.S., Office Action dated Jun. 1, 2017, in U.S. Appl. No. 15/372,324.

* cited by examiner

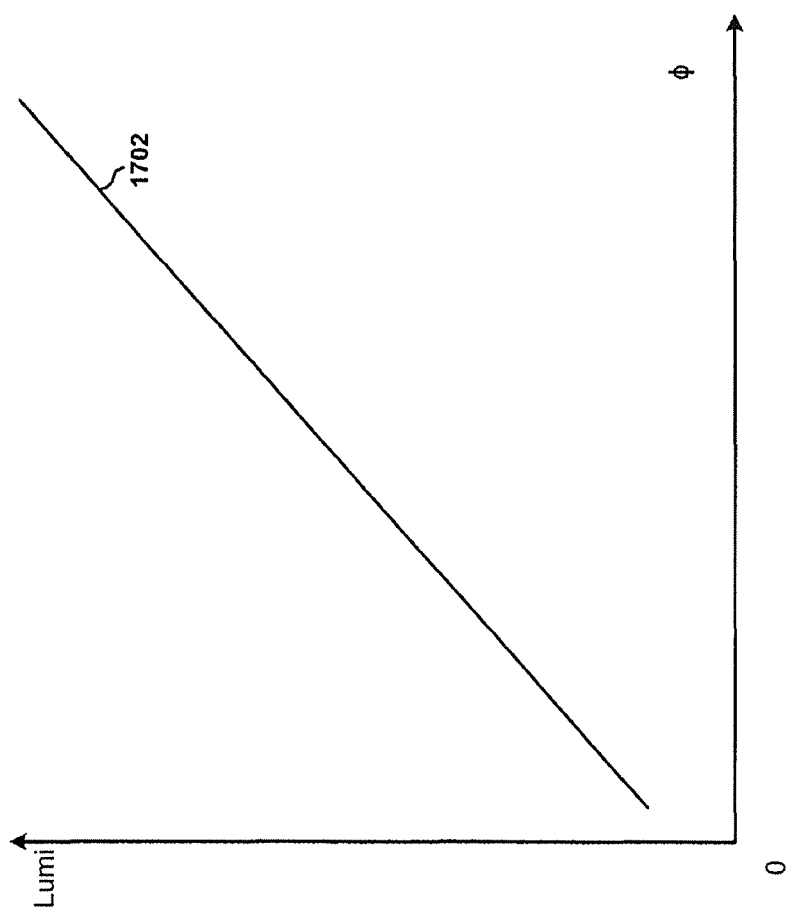

SYSTEMS AND METHODS FOR INTELLIGENT DIMMING CONTROL USING TIRAC DIMMERS

1. CROSS-REFERENCES TO RELATED APPLICATIONS

This application is a continuation of U.S. patent application Ser. No. 14/451,656, filed Aug. 5, 2014, which claims priority to Chinese Patent Application No. 201410322612.2, filed Jul. 8, 2014, commonly assigned, both of the above-referenced applications being incorporated by reference herein for all purposes.

2. BACKGROUND OF THE INVENTION

Certain embodiments of the present invention are directed to integrated circuits. More particularly, some embodiments of the invention provide a system and method for dimming control using TRIAC dimmers. Merely by way of example, some embodiments of the invention have been applied to driving light emitting diodes (LEDs). But it would be recognized that the invention has a much broader range of applicability.

Lighting systems including light emitting diodes (LEDs) often use a conventional light dimmer (e.g., wall mounted) that includes a Triode for Alternating Current (TRIAC) to adjust the brightness of LEDs. A TRIAC is bidirectional and currents can flow through a TRIAC in either direction (e.g., into the TRIAC or out of the TRIAC). A TRIAC can be triggered by a gate current (e.g., flowing in either direction) which is often generated by applying a voltage (e.g., a positive voltage or a negative voltage) to a gate electrode of a TRIAC. Once triggered, the TRIAC continues to conduct a current until the current drops below a certain threshold (e.g., a holding current). For example, a TRIAC dimmer is a dimmer (e.g., a light dimmer) that includes a Triode for Alternating Current.

FIG. 1 is a simplified diagram showing a conventional LED lighting system using a TRIAC dimmer. For example, the lighting system 100 implements a primary side regulation scheme and a flyback structure with single-stage power-factor-correction (PFC) for driving one or more LEDs 172. The system 100 includes a controller 102, an AC supply component 122, a TRIAC dimmer 118, a full wave rectifying bridge 124, capacitors 126, 136, 140, 150 and 170, resistors 128, 130, 134, 138, 146, 148, 154 and 156, power switches 132 and 152, diodes 142, 144 and 168, and a transformer including a primary winding 162, a secondary winding 164, and an auxiliary winding 166. The controller 102 includes terminals 104, 106, 108, 110, 112, 114, 116 and 120. For example, the power switch 132 and the power switch 152 are transistors. In another example, a TRIAC dimmer 118 is a dimmer that includes a Triode for Alternating Current (TRIAC).

As shown in FIG. 1, the TRIAC dimmer 118 processes an AC input signal 121 from the AC supply component 122, and generates a voltage signal 123 which is processed by the full wave rectifying bridge 124 in order to generate a voltage signal 174 (e.g., $V_{bulk}$). The TRIAC dimmer 118 is associated with a dimming period including an on period and an off period. During an on period of the TRIAC dimmer 118, the voltage signal 174 is approximately equal to the AC input signal 121 in magnitude. During an off period of the TRIAC dimmer 118, the voltage signal 174 has a low magnitude (e.g., corresponding to a logic low level). The capacitor 150 (e.g., $C_1$) is charged in response to the voltage signal 174 (e.g., $V_{bulk}$) through the resistor 138 (e.g., $R_3$), and a voltage signal 176 is generated at the terminal 112 (e.g., terminal VCC). If the voltage signal 176 exceeds an under-voltage-lock-out (UVLO) threshold voltage, the controller 102 is activated, and outputs a modulation signal 178 (e.g., a pulse-width-modulation (PWM) signal) through the terminal 116 (e.g., terminal GATE) in order to close (e.g., to turn on) or open (e.g., to turn off) the switch 152 (e.g., M2) for normal operation of the system 100. A voltage divider circuit including the resistor 130 (e.g., $R_2$) and the resistor 134 (e.g., $R_4$) generates a voltage signal 179 based on at least information associated with the voltage signal 174 (e.g., $V_{bulk}$). The controller 102 detects the signal 179 at the terminal 106 (e.g., terminal $V_S$) in order to affect the power factor and determine the status of the TRIAC dimmer.

When the controller 102 changes the modulation signal 178 to close (e.g., to turn on) the switch 152 (e.g., M2), a primary current 180 flows through the primary winding 162, and a current-sensing signal 188 is generated through the resistor 154 (e.g., $R_S$). The controller 102 detects the current-sensing signal 188 at the terminal 120 (e.g., terminal CS). For example, the peak values of the current-sensing signal 188 affect the signal 178 to open (e.g., to turn off) the switch 152 in each cycle. An auxiliary current 182 flows through the auxiliary winding 166 to charge the capacitor 150 (e.g., $C_1$), and a voltage signal 184 is generated at the auxiliary winding 166. A voltage divider circuit including the resistor 146 (e.g., $R_5$) and the resistor 148 (e.g., $R_6$) generates a voltage signal 186 based on at least information associated with the voltage signal 184. The controller 102 receives the signal 186 at the terminal 114 (e.g., terminal ZCD) in order to detect the end of a demagnetization process associated with the transformer including the secondary winding 164. In addition, the capacitor 170 is used to maintain output voltage for stable current output to the LEDs 172. During the on period of the TRIAC dimmer 118, the power switch 132 (e.g., M1) is open (e.g., off). During the off period of the TRIAC dimmer 118, the power switch 132 is closed (e.g., on) to provide a bleeding current in order for the TRIAC dimmer 118 to operate normally.

FIG. 2 shows a simplified diagram showing a relationship of brightness of the LEDs 172 as a function of the output current 198. The waveform 1302 represents the brightness of the LEDs 172 as a function of the output current 198. The brightness of the LEDs 172 does not change linearly with the output current 198.

FIG. 3 shows a simplified timing diagram for the conventional LED lighting system 100. The waveform 1502 represents the AC input signal 121 as a function of time, the waveform 1504 represents a voltage signal 123 in ideality as a function of time, and the waveform 1506 represents the voltage signal 174 in ideality as a function of time.

As shown in FIG. 3, the AC input signal 121 has a period of $2\pi$ (e.g., as shown by the waveform 1502). Ideally, the TRIAC dimmer 118 processes positive values and negative values in the AC input signal 121 the same to generate the voltage signal 123 (e.g., as shown by the waveform 1504). For example, during a part of a period (e.g., corresponding to a phase angle $\phi$), the voltage signal 123 follows the AC input signal 121 (e.g., approximately equal to the AC input signal 121 in magnitude), as shown by the waveform 1504. During the other part of the period, the voltage signal 123 has a low magnitude (e.g., zero). The phase angle $\phi$ is in a range of 0 to $\pi$. The full wave rectifying bridge 124 processes the voltage signal 123 and generates the voltage signal 174 with a period of $\pi$. The voltage signal 174 (e.g., $V_{bulk}$) has a same waveform during each on time period of the TRIAC dimmer 118 (e.g., as shown by the waveform 1506).

As an example, in order for the TRIAC dimmer 118 to operate normally, a bleeding current with a sufficient magnitude needs to be provided to flow through the TRIAC dimmer 118. As another example, if the phase angle φ is smaller than a phase-angle threshold (e.g., $\phi_0$), the voltage signal 123 has a smaller magnitude and the magnitude of the bleeding current becomes smaller than a bleeding current threshold. As yet another example, if the magnitude of the bleeding current becomes smaller than the bleeding current threshold, the TRIAC dimmer 118 cannot operate normally. As yet another example, if the magnitude of the bleeding current becomes smaller than the bleeding current threshold, the TRIAC dimmer 118 is turned off, causing a rapid decrease of the current flowing through the LEDs 172. For example, the TRIAC dimmer 118 is incapable of generating, with the rectifying bridge 124, a pulse associated with a pulse width smaller than the phase-angle threshold (e.g., $\phi_0$). In another example, the TRIAC dimmer 118 is capable of generating, with the rectifying bridge 124, a pulse associated with a pulse width larger than the phase-angle threshold (e.g., $\phi_0$).

FIG. 4 is a simplified conventional diagram of the controller 102 as shown in FIG. 1. The controller 102 includes a comparator 202, an error amplifier including a comparator 204 and a switch 205, a logic control component 206, a gate drive component 208, a signal generator 210 (e.g., a PWM signal generator), a multiplier 212, and a current regulation component 214. For example, the signal generator 210 is configured to generate one or more pulse-width-modulation signals. In another example, the signal generator 210 includes a comparator. The current regulation component 214 includes a current-sensing component 298 and another error amplifier 296.

As shown in FIG. 1 and FIG. 4, the comparator 204 receives the signal 179 and a threshold signal 226 in order to detect the status of the TRIAC dimmer 118, and outputs a dimming signal 228. The switch 205 is closed or open in response to the dimming signal 228 to affect the output current in order to adjust the brightness of the LEDs 172 (e.g., to adjust the brightness of the LEDs 172 linearly as a function of the output current). The current regulation component 214 receives the current sensing signal 188 at the terminal 120 (e.g., terminal CS) to detect the peak values of the primary current 180, and integrates the peak values of the primary current 180 over a demagnetization period associated with the transformer including the primary winding 162 and the secondary winding 164. Specifically, the current-sensing component 298 receives the current sensing signal 188 and outputs a signal 294 to the error amplifier 296. The error amplifier 296 also receives a reference signal 292 and outputs a processed signal 216 to the multiplier 212 which also receives the voltage signal 179 from the terminal 106 (e.g., terminal VS) and generates an output signal 218.

The signal generator 210 receives the current sensing signal 188 and the output signal 218 and generates a signal 220. During an operating cycle, if the modulation signal 178 is at a logic high level and the switch 152 is closed (e.g., turned on), the primary current 180 flowing through the switch 152 increases in magnitude. In response the current sensing signal 188 increases in magnitude. If the signal 188 becomes larger than the output signal 218 in magnitude, the signal generator 210 changes the signal 220 and the controller 102 changes the signal 178 from the logic high level to a logic low level to open (e.g., to turn off) the switch 152.

When the switch 152 is opened (e.g., turned off), the transformer including the primary winding 162 and the secondary winding 164 begins the demagnetization process.

The comparator 202 receives the signal 186 at the terminal 114 (e.g., terminal ZCD) and a threshold signal 222 to detect whether the demagnetization process has completed. If the demagnetization process is determined to be completed, the comparator 202 outputs a signal 224 in order to change the signal 178 to the logic high level. During the off period of the TRIAC dimmer 118, the logic control component 206 outputs a signal 230 to close (e.g., to turn on) the switch 132 (e.g., M1) in order to provide a bleeding current for the normal operation of the TRIAC dimmer 118.

During the off period of the TRIAC dimmer 118, an average value of an output current 198 is determined as follows:

$$\overline{I_0} = \frac{1}{2} \times N \times \frac{V_{ref\_ea}}{R_s} \qquad \text{(Equation 1)}$$

where N represents a turns ratio between the primary winding 162 and the secondary winding 164, $V_{ref\_ea}$ represents the reference signal 292, and $R_S$ represents a resistance of the resistor 154. When the TRIAC dimmer 118 is turned on and off to perform dimming control, an average value of the output current 198 is determined as follows:

$$\overline{I_0} = \frac{\phi}{\pi} \times \frac{1}{2} \times N \times \frac{V_{ref\_ea}}{R_s} \qquad \text{(Equation 2)}$$

where φ represents a phase angle associated with the TRIAC dimmer 118.

The system 100 has some disadvantages, such as flickering of the LEDs 172 under certain circumstances. Hence it is highly desirable to improve the techniques of dimming control.

3. BRIEF SUMMARY OF THE INVENTION

Certain embodiments of the present invention are directed to integrated circuits. More particularly, some embodiments of the invention provide a system and method for dimming control using TRIAC dimmers. Merely by way of example, some embodiments of the invention have been applied to driving light emitting diodes (LEDs). But it would be recognized that the invention has a much broader range of applicability.

According to one embodiment, an apparatus for a power conversion system includes: a process-and-drive component configured to receive an input signal, process information associated with the input signal, and output a drive signal to a switch to affect a current that flows through a primary winding of a power conversion system. The input signal includes a first pulse associated with a first input period and a second pulse associated with a second input period. The drive signal is associated with a first modulation period for the first input period and a second modulation period for the second input period. The process-and-drive component is further configured to: determine the first modulation period for the first input period; change the drive signal between a first logic level and a second logic level at a modulation frequency during the first modulation period; determine the second modulation period for the second input period; and change the drive signal between the first logic level and the second logic level at the modulation frequency during the second modulation period. The first pulse corresponds to a first pulse width. The second pulse corresponds to a second pulse width. The first modulation period corresponds to a first duration. The second modulation period corresponds to a second duration. The first pulse width and the second pulse width are different in magnitude. The first duration and the second duration are equal in magnitude.

According to another embodiment, an apparatus for a power conversion system includes: a process-and-drive component configured to receive an input signal, process information associated with the input signal, and output a drive signal to a switch to affect a current that flows through a primary winding of a power conversion system. The input signal includes one or more input pulses and a first input pulse, the one or more input pulses corresponding to one or more input periods respectively, the first input pulse corresponding to a first input period, the first input period being after the one or more input periods. The drive signal is associated with one or more modulation periods and a first modulation period, the one or more modulation periods corresponding to the one or more input periods respectively, the first modulation period corresponding to the first input period. The one or more input pulses are associated with one or more pulse widths respectively. The process-and-drive component is further configured to: process information associated with the one or more pulse widths; select a first smallest pulse width from the one or more pulse widths; determine a first duration of the first modulation period based on at least information associated with the first smallest pulse width; and change the drive signal between a first logic level and a second logic level at a modulation frequency during the first modulation period.

According to yet another embodiment, an apparatus for a power conversion system includes: a process-and-drive component configured to receive an input signal associated with a TRIAC dimmer and output a drive signal to a switch to affect a current that flows through a primary winding of a power conversion system. The input signal includes a first pulse corresponding to a first input period, the first pulse being associated with a first pulse width. The first pulse width is larger than a first threshold for normal operation of the TRIAC dimmer. The process-and-drive component is further configured to: process information associated with the first pulse width and a second threshold, the second threshold being larger than the first threshold, and in response to the first pulse width being smaller than the second threshold, even if the first pulse width is still larger than the first threshold, maintain the drive signal at a first logic level without modulation to keep the switch open during at least the first input period.

In one embodiment, an apparatus for a power conversion system includes: a process-and-drive component configured to receive an input signal and output a drive signal to a switch to affect a current that flows through one or more light emitting diodes, the one or more light emitting diodes being associated with a secondary winding of a power conversion system. The input signal includes a pulse associated with a pulse width. The process-and-drive component is further configured to: process information associated with the pulse width; and generate the drive signal based on at least information associated with the pulse width so that the current changes non-linearly with the pulse width but a brightness of the one or more light emitting diodes changes linearly with the pulse width.

In another embodiment, a method for a power conversion system includes: receiving an input signal including a first pulse associated with a first input period and a second pulse associated with a second input period; processing information associated with the input signal; and outputting a drive signal to a switch to affect a current that flows through a primary winding of a power conversion system, the drive signal being associated with a first modulation period for the first input period and a second modulation period for the second input period. The processing information associated with the input signal includes: determining the first modulation period for the first input period; and determining the second modulation period for the second input period. The outputting a drive signal to a switch to affect a current that flows through a primary winding of a power conversion system includes: changing the drive signal between a first logic level and a second logic level at a modulation frequency during the first modulation period; and changing the drive signal between the first logic level and the second logic level at the modulation frequency during the second modulation period. The first pulse corresponds to a first pulse width. The second pulse corresponds to a second pulse width. The first modulation period corresponds to a first duration. The second modulation period corresponds to a second duration. The first pulse width and the second pulse width are different in magnitude. The first duration and the second duration are equal in magnitude.

In yet another example, a method for a power conversion system includes: receiving an input signal, the input signal including one or more input pulses and a first input pulse, the one or more input pulses corresponding to one or more input periods respectively, the first input pulse corresponding to a first input period, the first input period being after the one or more input periods; processing information associated with the input signal; and outputting a drive signal to a switch to affect a current that flows through a primary winding of a power conversion system, the drive signal being associated with one or more modulation periods and a first modulation period. The one or more modulation periods correspond to the one or more input periods respectively. The first modulation period corresponds to the first input period. The one or more input pulses are associated with one or more pulse widths respectively. The processing information associated with the input signal includes: processing information associated with the one or more pulse widths; selecting a first smallest pulse width from the one or more pulse widths; and determining a first duration of the first modulation period based on at least information associated with the first smallest pulse width. The outputting a drive signal to a switch to affect a current that flows through a primary winding of a power conversion system includes changing the drive signal between a first logic level and a second logic level at a modulation frequency during the first modulation period.

According to one embodiment, a method for a power conversion system includes: receiving an input signal associated with a TRIAC dimmer, the input signal including a first pulse corresponding to a first input period, the first pulse being associated with a first pulse width, the first pulse width being larger than a first threshold for normal operation of the TRIAC dimmer; processing information associated with the input signal; and outputting a drive signal to a switch to affect a current that flows through a primary winding of a power conversion system. The processing information associated with the input signal includes processing information associated with the first pulse width and a second threshold, the second threshold being larger than the first threshold. The outputting a drive signal to a switch to affect a current that flows through a primary winding of a power conversion system includes, in response to the first pulse width being smaller than the second threshold, even if the first pulse width is still larger than the first threshold, maintaining the drive signal at a first logic level without modulation to keep the switch open during at least the first input period.

According to another embodiment, a method for a power conversion system includes: receiving an input signal including a pulse associated with a pulse width; processing information associated with the input signal; and outputting a drive signal to a switch to affect a current that flows through one or more light emitting diodes, the one or more light emitting diodes being associated with a secondary winding of a power conversion system. The processing information associated with the input signal includes processing information associated with the pulse width. The outputting a drive signal to a switch to affect a current that flows through one or more light emitting diodes includes generating the drive signal based on at least information associated with the pulse width so that the current changes non-linearly with the pulse width but a brightness of the one or more light emitting diodes changes linearly with the pulse width.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 15(C) is a simplified diagram showing a relationship between brightness of LEDs and a phase angle of a voltage signal according to an embodiment of the present invention.

5. DETAILED DESCRIPTION OF THE INVENTION

Certain embodiments of the present invention are directed to integrated circuits. More particularly, some embodiments of the invention provide a system and method for dimming control using TRIAC dimmers. Merely by way of example, some embodiments of the invention have been applied to driving light emitting diodes (LEDs). But it would be recognized that the invention has a much broader range of applicability.

Figure 5:
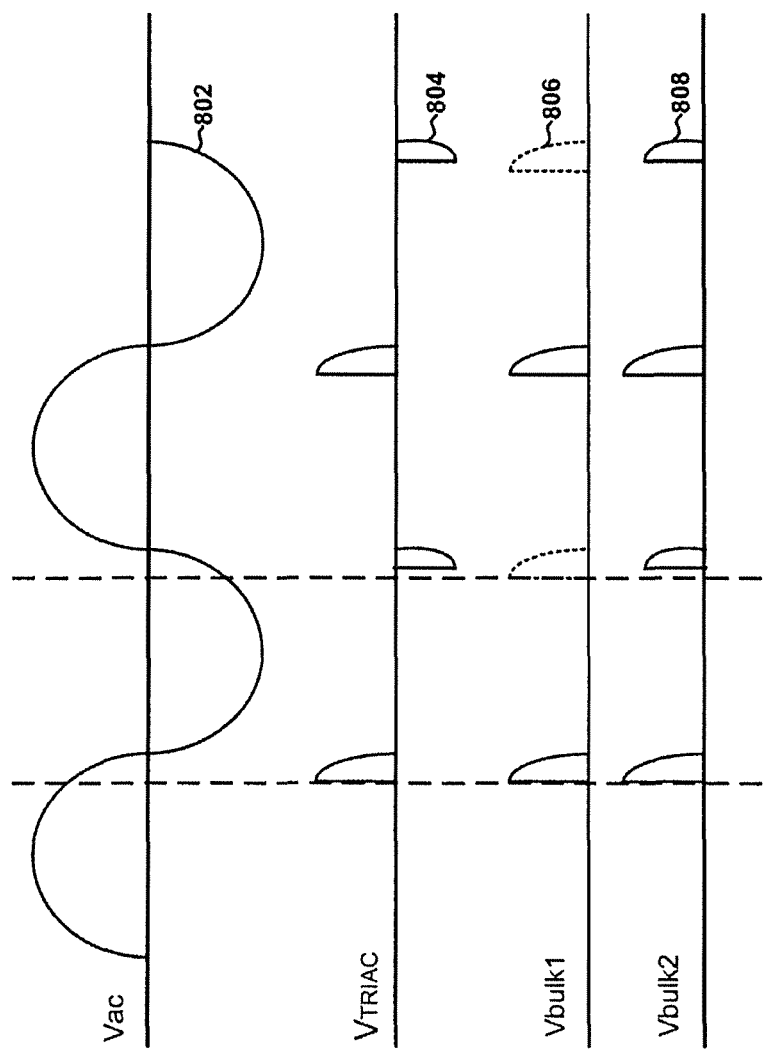
FIG. 5 shows a simplified timing diagram for analyzing certain disadvantages of the conventional LED lighting system as shown in FIG. 1.

FIG. 5 shows a simplified timing diagram for analyzing certain disadvantages of the conventional LED lighting system 100. The waveform 802 represents the AC input signal 121 as a function of time, the waveform 804 represents a voltage signal 123 as a function of time, the waveform 806 represents the voltage signal 174 in ideality as a function of time, and the waveform 808 represents the voltage signal 174 in reality as a function of time.

Figure 1:
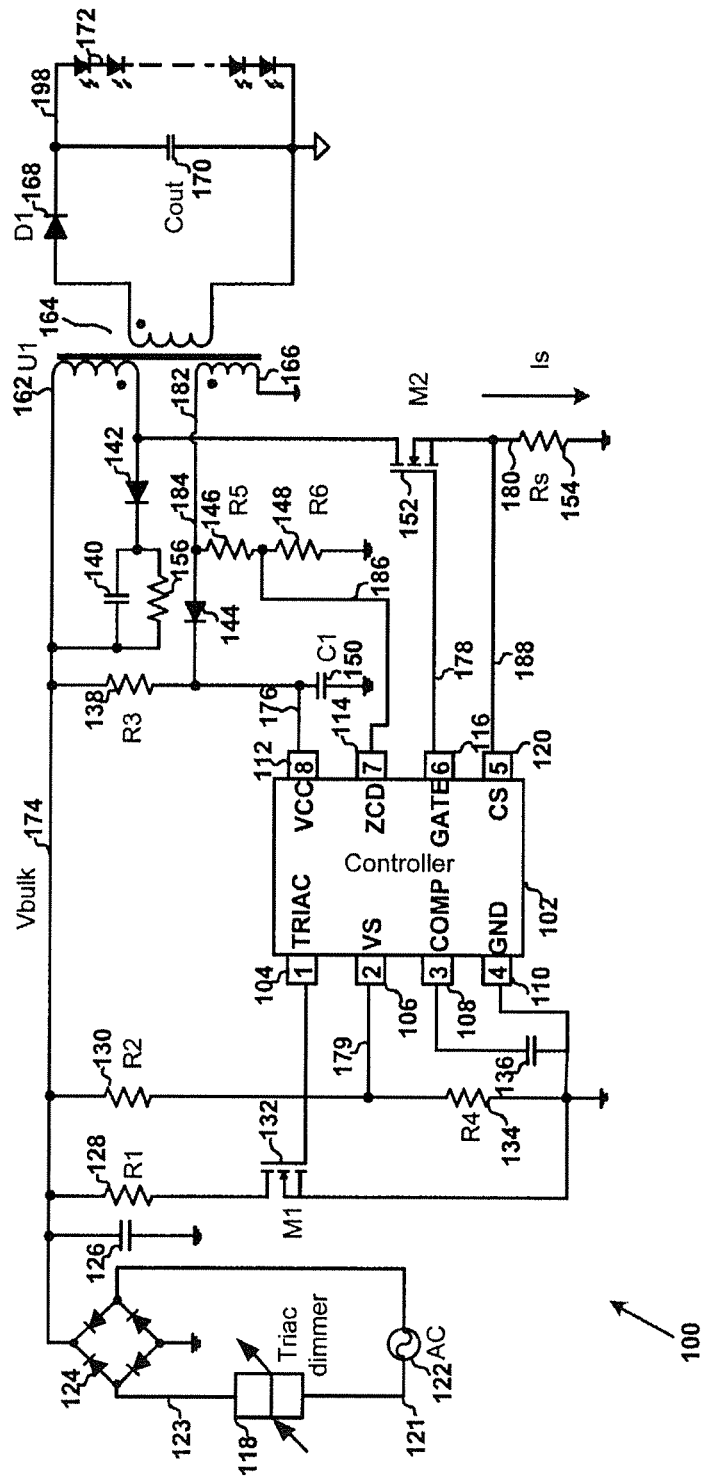
FIG. 1 is a simplified diagram showing a conventional LED lighting system using a TRIAC dimmer.
Figure 2:
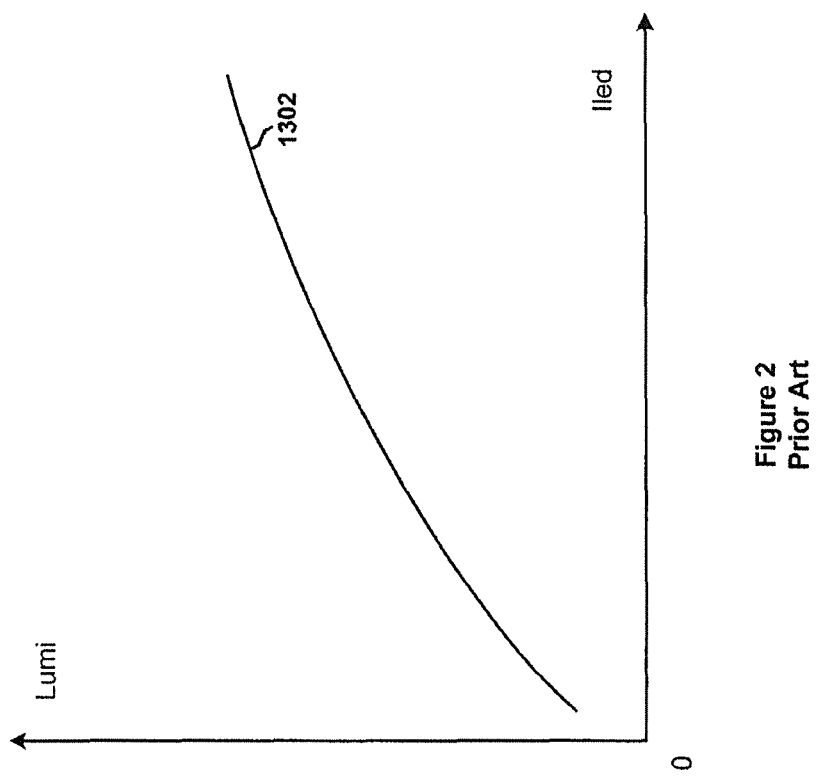
FIG. 2 shows a simplified diagram showing a relationship of brightness of LEDs as a function of an output current.
Figure 3:
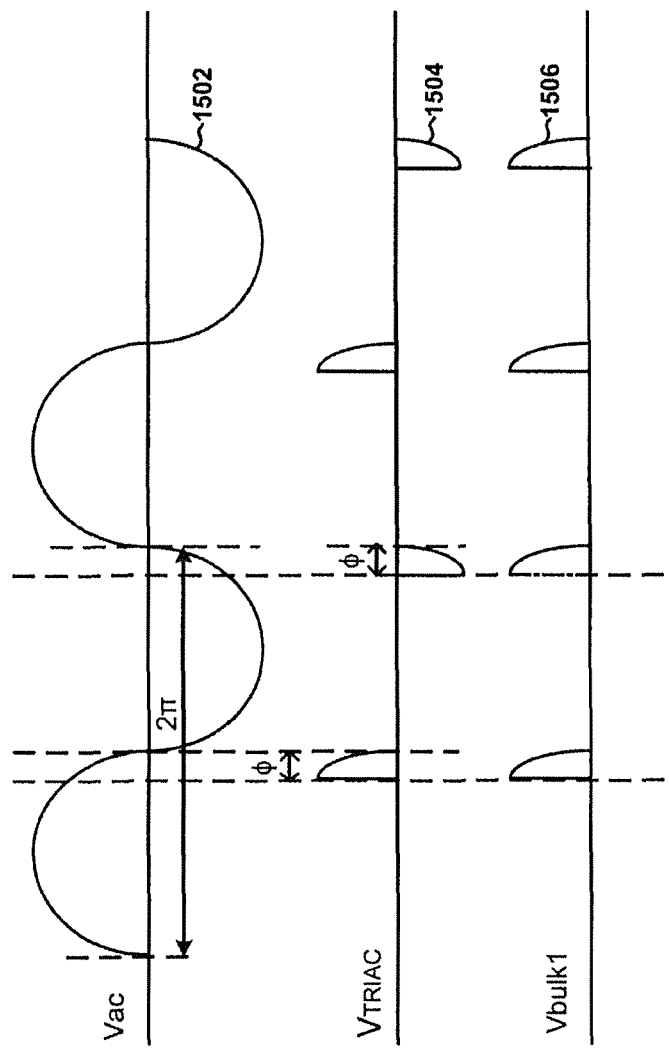
FIG. 3 shows a simplified timing diagram for the conventional LED lighting system as shown in FIG. 1.

Referring back to FIG. 1, the TRIAC dimmer 118, because of its intrinsic characteristics, processes positive values and negative values in the AC input signal 121 differently to generate the voltage signal 123 (e.g., as shown by the waveform 804). Ideally, the voltage signal 174 (e.g., $V_{bulk}$) has a same waveform during each on time period of the TRIAC dimmer 118 (e.g., as shown by the waveform 806). But in reality, the waveform of the voltage signal 174 (e.g., $V_{bulk}$) during each on time period of the TRIAC dimmer 118 varies over time (e.g., as shown by the waveform 808). Such variance affects the output current of the system 100. If the conduction angle of the TRIAC dimmer 118 is large, the LEDs 172 are bright enough so that human observers can hardly perceive any flickering. But if the conduction angle of the TRIAC dimmer 118 is small, the LEDs 172 are not very bright. If the current flowing through the LEDs 172 varies in different operating periods, human observers can perceive flickering of the LEDs 172.

Figure 6:
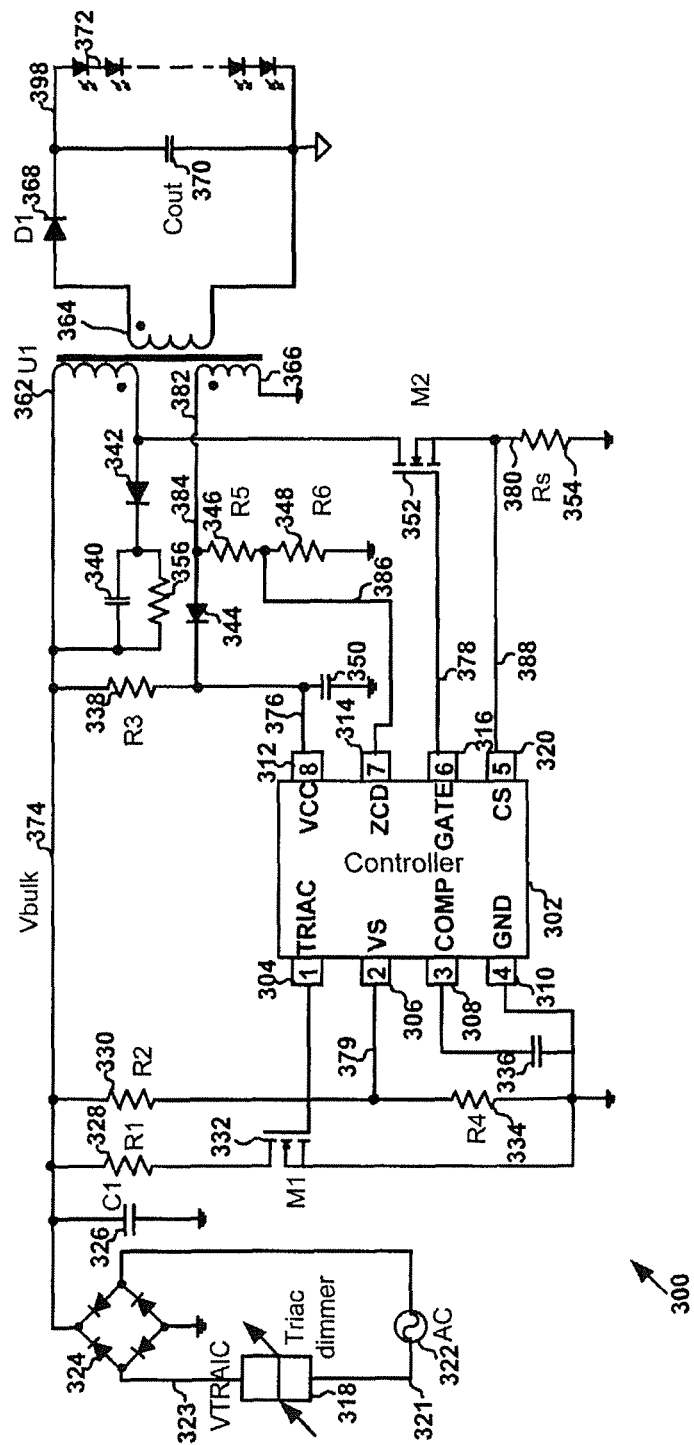
FIG. 6 is a simplified diagram showing a lighting system according to an embodiment of the present invention.

FIG. 6 is a simplified diagram showing a lighting system according to an embodiment of the present invention. This diagram is merely an example, which should not unduly limit the scope of the claims. One of ordinary skill in the art would recognize many variations, alternatives, and modifications. The system 300 includes a system controller 302, an AC supply component 322, a TRIAC dimmer 318, a full wave rectifying bridge 324, capacitors 326, 336, 340, 350 and 370, resistors 328, 330, 334, 338, 346, 348, 354 and 356, power switches 332 and 352, diodes 342, 344 and 368, and a transformer including a primary winding 362, a secondary winding 364, and an auxiliary winding 366. The system controller 302 includes terminals 304, 306, 308, 310, 312, 314, 316 and 320. For example, the power switch 332 and the power switch 352 include transistors. In another example, a TRIAC dimmer 318 includes a Triode for Alternating Current (TRIAC).

As shown in FIG. 6, a voltage signal 374 (e.g., $V_{bulk}$) is generated when an AC input signal 321 from the AC supply component 322 is processed by the TRIAC dimmer 318 and the rectifying bridge 324 according to certain embodiments. For example, the TRIAC dimmer 318 is associated with a dimming period including an on period and an off period. In another example, during an on period of the TRIAC dimmer 318, the voltage signal 374 is approximately equal to the AC input signal 321 in magnitude. In yet another example, during an off period of the TRIAC dimmer 318, the voltage signal 374 has a low magnitude (e.g., corresponding to a logic low level). In yet another example, the capacitor 350 (e.g., $C_1$) is charged in response to the voltage signal 374 (e.g., $V_{bulk}$) through the resistor 338 (e.g., $R_3$), and a voltage signal 376 is generated at the terminal 312 (e.g., terminal VCC). In yet another example, the TRIAC dimmer 318 is under an on condition during the on period, and under an off condition during the off period.

According to certain embodiments, if the voltage signal 376 exceeds an under-voltage-lock-out (UVLO) threshold voltage, the system controller 302 is activated, and outputs a control signal 378 through the terminal 316 in order to close (e.g., to turn on) or open (e.g., to turn off) the switch 352 (e.g., M2). For example, the control signal 378 is a pulse-width-modulation (PWM) signal to close (e.g., to turn on) or open (e.g., to turn off) the switch 352 for normal operation of the system 300. As an example, the switch 352 is closed or opened according to a switching frequency that corresponds to one or more switching periods. In certain embodiments, the switch 352 is a field effect transistor, which can be closed (e.g., turned on) or opened (e.g., turned off) by the control signal 378. In yet another example, the control signal 378 is a voltage signal. In yet another example, if the control signal 378 is at the logic high level, the field effect transistor is closed (e.g., turned on). In yet another example, if the control signal 378 is at the logic low level, the field effect transistor is opened (e.g., turned off). In yet another example, the control signal 378 is associated with one or more modulation periods corresponding to a modulation frequency (e.g., the switching frequency). In yet another example, each modulation period corresponds to a same duration. In yet another example, the modulation periods correspond to different durations.

According to one embodiment, the switch 352 is a bipolar junction transistor, which can be closed (e.g., turned on) or opened (e.g., turned off) by the control signal 378. For example, the control signal 378 is a current signal. In another example, if the control signal 378 is at a high current level, the bipolar transistor is closed (e.g., turned on). In yet another example, if the control signal 378 is at a low current level, the field effect transistor is opened (e.g., turned off). In yet another example, a voltage divider circuit including the resistor 330 (e.g., $R_2$) and the resistor 334 (e.g., $R_4$) generates a voltage signal 379 based on at least information associated with the voltage signal 374 (e.g., $V_{bulk}$). In yet another example, the system controller 302 detects the signal 379 at the terminal 306 (e.g., terminal $V_S$) in order to affect the power factor and determine the status of the TRIAC dimmer. For example, the voltage signal 379 is proportional to the voltage signal 374 in magnitude. In another example, the voltage signal 379 has a same phase as the voltage signal 374. In yet another example, the signal 379 includes one or more pulses associated with one or more input periods, where each pulse is related to a pulse width. In yet another example, an input period includes an on-time period and an off-time period, where during the off-time period, the signal 379 has a low magnitude (e.g., 0).

According to another embodiment, when the system controller 302 changes the signal 378 to close (e.g., to turn on) the switch 352 (e.g., M2), a primary current 380 flows through the primary winding 362, and a current-sensing signal 388 is generated through the resistor 354 (e.g., $R_S$). For example, the system controller 302 detects the current-sensing signal 388 at the terminal 320 (e.g., terminal CS). In another example, the peak values of the current-sensing signal 388 affect the signal 378 to open (e.g., to turn off) the switch 352 in each cycle. In yet another example, an auxiliary current 382 flows through the auxiliary winding 366 to charge the capacitor 350, and a voltage signal 384 is generated at the auxiliary winding 366. In yet another example, a voltage divider circuit including the resistor 346 and the resistor 348 generates a voltage signal 386 based on at least information associated with the voltage signal 384. In yet another example, the system controller 302 receives the signal 386 at the terminal 314 (e.g., terminal ZCD) in order to detect the end of a demagnetization process associated with the transformer including the secondary winding 364. In yet another example, during the on period of the TRIAC dimmer 318, the power switch 332 (e.g., M1) is open (e.g., off), and during the off period of the TRIAC dimmer 318, the power switch 332 is closed (e.g., on) to provide a bleeding current in order for the TRIAC dimmer 318 to operate normally. In yet another example, the capacitor 370 is used to maintain output voltage for stable current output to the LEDs 372.

In some embodiments, the system controller 302 is configured to compare phase angles of the voltage signal 374 (e.g., $V_{bulk}$) in multiple consecutive periods (e.g., $T_{bulk}$) associated with the voltage signal 374, determine a smallest phase angle thereof, and cause an output current 398 to be generated to flow through the LEDs 372 during part of each period (e.g., $T_{bulk}$) corresponding to the smallest phase angle. In certain embodiments, the system controller 302 is configured to precisely adjust the output current 398 based on at least information associated with phase angles of the voltage signal 374. For example, the system controller 302 is configured to optimize a relationship between the phase angles of the voltage signal 374 and the output current 398 so that the brightness of the LEDs 372 changes (e.g., linearly) with the phase angles of the voltage signal 374. In another example, the system controller 302 is configured to provide a bleeding current to the TRIAC dimmer 318 for the normal operation of the TRIAC dimmer 318 so that the output current 398 does not change rapidly over a range of phase angles (e.g., pulse widths) for the voltage signal 374 (e.g., $V_{bulk}$). In yet another example, the system controller 302 is configured to generate the drive signal 378 based on at least information associated with the phase angle of the voltage signal 374 and/or the phase angle of the voltage signal 379 (e.g., pulse width), so that the output current 398 changes non-linearly with the phase angle, but the brightness of the LEDs 372 changes linearly with the phase angle.

Figure 7:
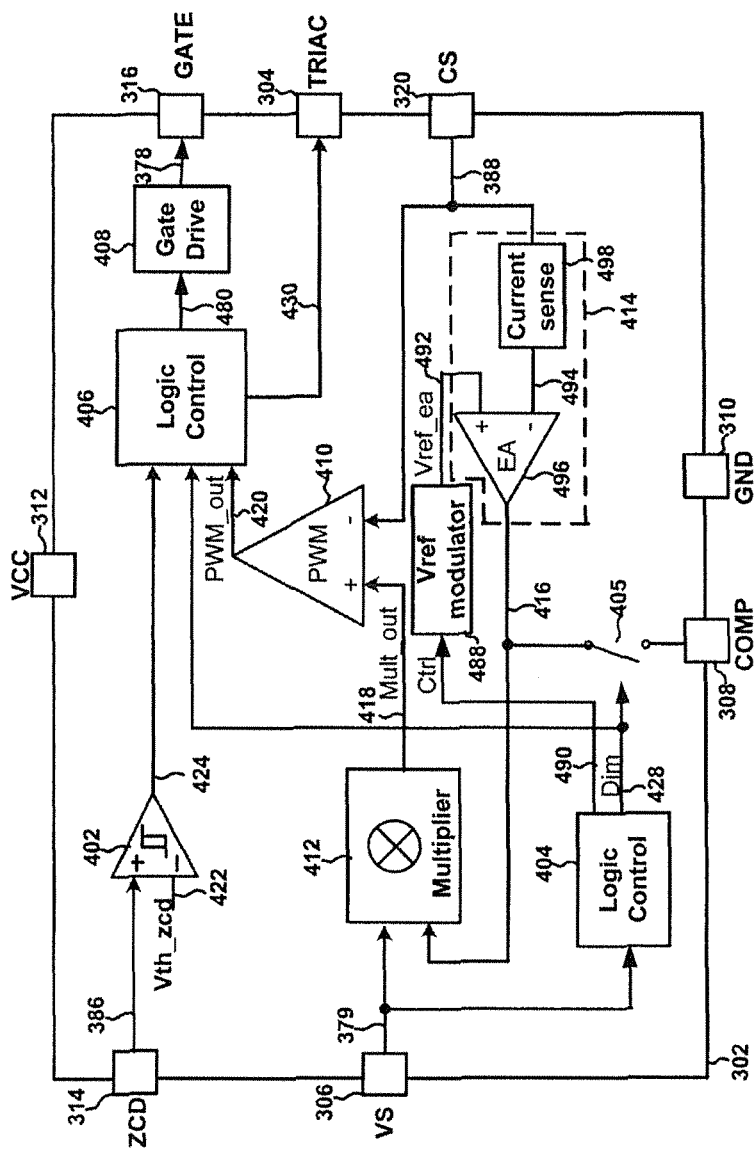
FIG. 7 is a simplified diagram of a system controller as part of the system as shown in FIG. 6 according to an embodiment of the present invention.

FIG. 7 is a simplified diagram of the system controller 302 as part of the system 300 according to an embodiment of the present invention. This diagram is merely an example, which should not unduly limit the scope of the claims. One of ordinary skill in the art would recognize many variations, alternatives, and modifications. The system controller 302 includes a comparator 402, a signal processor 404, a switch 405, a logic control component 406, a gate drive component 408, a signal generator 410 (e.g., a PWM signal generator), a multiplier 412, a current regulation component 414, and a voltage modulator 488. The current regulation component 414 includes an error amplifier 496 and a current-sensing component 498.

As shown in FIG. 6 and FIG. 7, the signal processor 404 receives the signal 379 to detect the status of the TRIAC dimmer 318, and outputs a dimming signal 428 and a control signal 490 in some embodiments. For example, if the dimming signal 428 is at the logic high level, the switch 405 is closed to affect the output current in order to adjust the brightness of the LEDs 372 (e.g., linearly or non-linearly). In another example, the current regulation component 414 receives the current sensing signal 388 at the terminal 320 (e.g., terminal CS) to detect the peak values of the primary current 380, and integrates the peak values of the primary current 380 over a demagnetization period associated with the transformer that includes the primary winding 362 and the secondary winding 364. In yet another example, the current-sensing component 498 receives the signal 388 and outputs a signal 494 to the error amplifier 496 that also receives a reference signal 492 from the voltage modulator 488. In yet another example, the error amplifier 496 outputs a processed signal 416 to the multiplier 412 that also receives the voltage signal 379 from the terminal 306 (e.g., terminal VS) and generates an output signal 418.

According to one embodiment, the signal generator 410 receives the current sensing signal 388 and the output signal 418 and generates a signal 420. For example, during an operating cycle, if the switch 352 is closed (e.g., turned on) in response to the signal 378, the primary current 380 flowing through the switch 352 increases in magnitude, and in response the current sensing signal 388 also increases in magnitude. In yet another example, if the signal 388 becomes larger than the output signal 418 in magnitude, the signal generator 410 changes the signal 420 and the system controller 302 changes the signal 378 in order to open (e.g., to turn off) the switch 352.

According to another embodiment, the comparator 402 receives the signal 386 and a threshold signal 422 to detect whether the demagnetization process has completed. For example, if the demagnetization process is determined to be completed, the comparator 402 outputs a signal 424 to change the signal 378 in order to close (e.g., turn on) the switch 352. In another example, the logic control component 406 receives the signal 424, the dimming signal 428 and the signal 420 and outputs a signal 480 to the gate drive component 408. In yet another example, the logic control component 406 outputs a signal 430 through the terminal 304 (e.g., terminal TRIAC) to affect the status of the switch 332.

In one embodiment, if the dimming signal 428 is at the logic high level (e.g., during the on period of the TRIAC dimmer 318), in response to the signals 420 and 424, the logic control component 406 changes the signal 480 between the logic high level and the logic low level to affect the signal 378 in order to close (e.g., to turn on) or open (e.g., to turn off) the switch 352 corresponding to a modulation frequency. For example, the modulation frequency is equal to 1 divided by a corresponding modulation period.

In another embodiment, if the dimming signal 428 is at the logic low level (e.g., during the off period of the TRIAC dimmer 318), the logic control component 406 keeps the signal 480 at the logic high level to affect the signal 378 in order to keep the switch 352 closed (e.g., on) for a first period of time. For example, the first period of time is equal to or larger than the modulation period. In another example, the first period of time is larger than the modulation period. In yet another example, the first period of time is equal to, in duration, the off period of the TRIAC dimmer 318.

In yet another embodiment, the dimming signal 428 is a logic signal, and the duty cycle of the dimming signal 428 represents a phase angle of the voltage signal 374. For example, the duty cycle of the dimming signal 428 increases with the increasing phase angle of the voltage signal 374. In another example, the duty cycle of the dimming signal 428 increases with the decreasing phase angle of the voltage signal 374. In yet another example, the duty cycle of the dimming signal 428 is proportional to the phase angle of the voltage signal 374. In yet another example, if the frequency of the dimming signal 428 remains constant, a pulse width of the dimming signal 428 represents the phase angle of the voltage signal 374. As an example, the pulse width of the dimming signal 428 increases with the increasing phase angle of the voltage signal 374. In another example, the pulse width of the dimming signal 428 increases with the decreasing phase angle of the voltage signal 374. In yet another example, the pulse width of the dimming signal 428 is proportional to the phase angle of the voltage signal 374.

In yet another embodiment, the control signal 490 is an analog signal, which represents the phase angle of the voltage signal 374. For example, the control signal 490 is a logic signal, and the duty cycle of the control signal 490 represents the phase angle of the voltage signal 374. As an example, the duty cycle of the control signal 490 changes (e.g., linearly or non-linearly) with the phase angle of the voltage signal 374. For example, the duty cycle of the control signal 490 increases with the increasing phase angle of the voltage signal 374. In another example, the duty cycle of the control signal 490 increases with the decreasing phase angle of the voltage signal 374. As another example, the duty cycle of the control signal 490 is proportional to the phase angle of the voltage signal 374. In yet another example, if the frequency of the control signal 490 remains constant, a pulse width of the control signal 490 represents the phase angle of the voltage signal 374. For example, the pulse width of the control signal 490 increases with the increasing phase angle of the voltage signal 374. In another example, the pulse width of the control signal 490 increases with the decreasing phase angle of the voltage signal 374. In yet another example, the pulse width of the control signal 490 is proportional to the phase angle of the voltage signal 374. In yet another example, the dimming signal 428 is the same as the control signal 490. In yet another example, the dimming signal 428 is different from the control signal 490.

Figure 8:
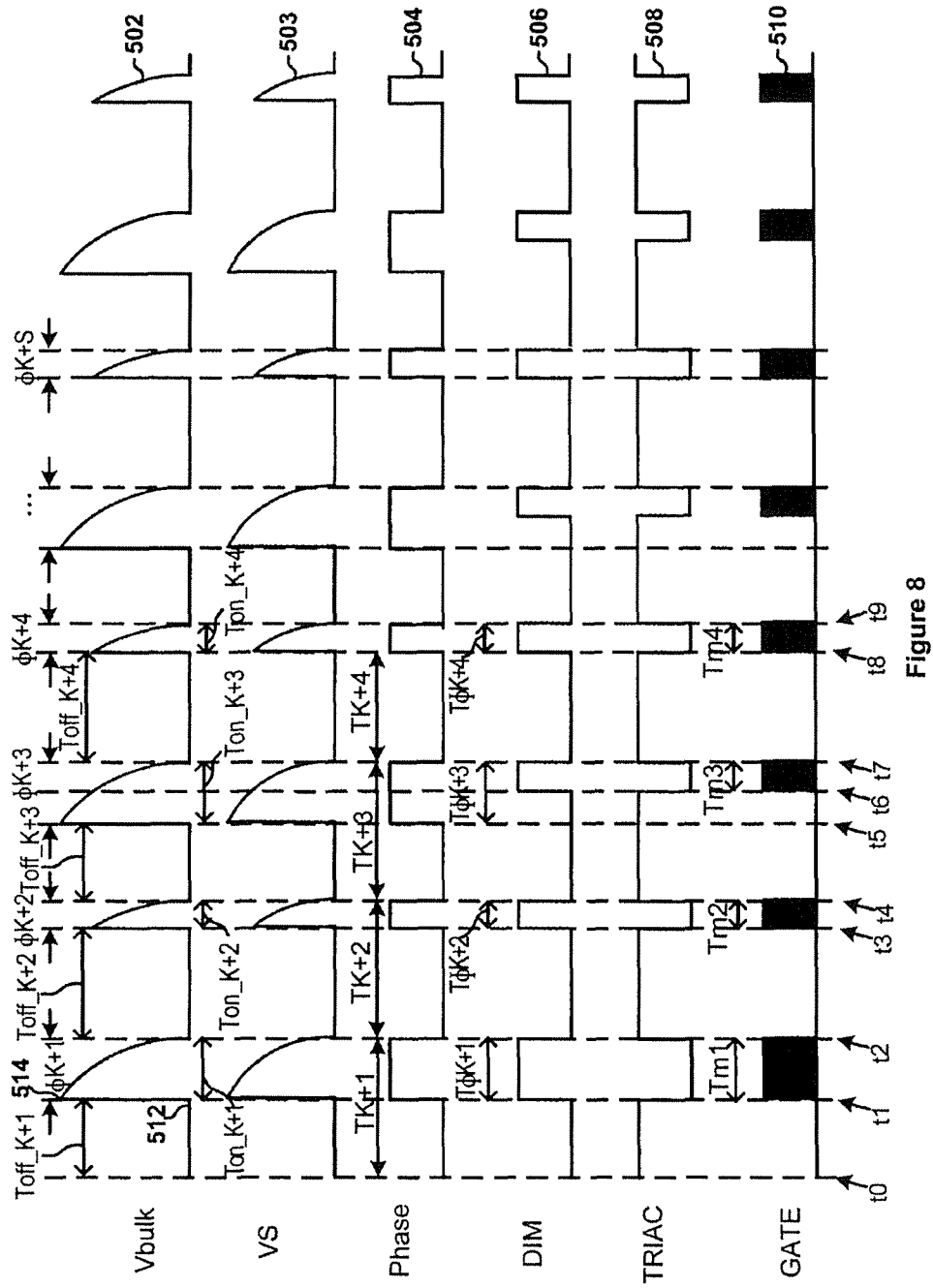
FIG. 8 shows simplified timing diagrams for the system as shown in FIG. 6 according to an embodiment of the present invention.

FIG. 8 shows simplified timing diagrams for the system 300 according to an embodiment of the present invention. These diagrams are merely examples, which should not unduly limit the scope of the claims. One of ordinary skill in the art would recognize many variations, alternatives, and modifications. The waveform 502 represents the voltage signal 374 as a function of time, the waveform 504 represents the voltage signal 379 as a function of time, the waveform 504 represents phase angles associated with the voltage signal 374 and/or the voltage signal 379 as a function of time, the waveform 506 represents the dimming signal 428 as a function of time, the waveform 508 represents the signal 480 as a function of time, and the waveform 510 represents the switch 352 being closed or opened in response to the signal 378 as a function of time.

Four on-time periods and four off-time periods associated with the TRIAC dimmer 318 are shown in FIG. 8. The on-time period $T_{on\_k+1}$ starts at $t_1$ and ends at $t_2$, and the on-time period $T_{on\_k+2}$ starts at $t_3$ and ends at $t_4$, where $k \geq 0$. In addition, the on-time period $T_{on\_k+3}$ starts at $t_5$ and ends at $t_7$, and the on-time period $T_{on\_k+4}$ starts at $t_8$ and ends at $t_9$. The off-time period $T_{off\_k+1}$ starts at $t_0$ and ends at $t_1$, and the off-time period $T_{off\_k+2}$ starts at $t_2$ and ends at $t_3$. Moreover, the off-time period $T_{off\_k+3}$ starts at $t_4$ and ends at $t_5$, and the off-time period $T_{off\_k+4}$ starts at $t_7$ and ends at $t_8$. For example, $t_0 \leq t_1 \leq t_2 \leq t_3 \leq t_4 \leq t_5 \leq t_6 \leq t_7 \leq t_8 \leq t_9$.

As shown in FIG. 7 and FIG. 8, the signal processor 404 converts the voltage signal 379 (e.g., as shown by the waveform 503) to a digital signal corresponding to the phase angles of the voltage signal 374 (e.g., $V_{bulk}$) associated with different periods of the voltage signal 374 (e.g., as shown by the waveform 504), in some embodiments. For example, the signal processor 404 records and compares the phase angles of the voltage signal 374 associated with multiple periods (e.g., s periods, where s is an integer larger than 1) of the voltage signal 374, and determines a smallest phase angle among those recorded phase angles. Then, the signal processor 404 outputs the dimming signal 428 that indicates the smallest phase angle to affect the output current 398 and the bleeding current associated with the switch 332, in some embodiments.

According to one embodiment, the signal processor 404 records and compares the phase angles (e.g., $\phi_{k+1}$ and $\phi_{k+2}$) of the voltage signal 374 associated with a first period (e.g., $T_{k+1}$ between $t_0$ and $t_2$) and a second period (e.g., $T_{k+2}$ between $t_2$ and $t_4$) respectively. For example, during the first period, the signal processor 404 outputs a first pulse in the dimming signal 428 with a first pulse width (e.g., $T_{\phi k+1}$ between $t_1$ and $t_2$) corresponding to the first phase angle $\phi_{k+1}$ (e.g., as shown by the waveform 506). During the second period, the signal processor 404 outputs a second pulse in the dimming signal 428 with a second pulse width (e.g., $T_{\phi k+2}$ between $t_3$ and $t_4$) corresponding to the second phase angle $\phi_{k+2}$ (e.g., as shown by the waveform 506). As an example, the signal processor 404 determines that the second phase angle $\phi_{k+2}$ is smaller than the first phase angle $\phi_{k+1}$ and selects the second phase angle $\phi_{k+2}$ as a smallest phase angle. Then, the signal processor 404 compares the second phase angle $\phi_{k+2}$ with a third phase angle $\phi_{k+3}$ associated with a third period (e.g., $T_{k+3}$ between $t_4$ and $t_7$), as an example. If the third phase angle $\phi_{k+3}$ is larger than the second phase angle $\phi_{k+2}$, the signal processor 404 outputs a pulse in the dimming signal 428 with a pulse width (e.g., $T_{\phi k+3}$ between $t_6$ and $t_7$) corresponding to the second phase angle $\phi_{k+2}$ instead of the third phase angle $\phi_{k+3}$ during the third period (e.g., as shown by the waveform 506), according to certain embodiments. On the other hand, if the third phase angle $\phi_{k+3}$ is smaller than the second phase angle $\phi_{k+2}$, the signal processor 404 would output a pulse in the dimming signal 428 with a pulse width corresponding to the third phase angle $\phi_{k+3}$ during the third period, according to some embodiments.

According to yet another embodiment, at the beginning of the on-time period $T_{on\_k+1}$ (e.g., at $t_1$), the voltage signal 374 (e.g., $V_{bulk}$) changes from a low magnitude 512 (e.g., approximately zero) to a large magnitude 514 (e.g., as shown by the waveform 502), and in response the signal 379 changes from a low magnitude to a large magnitude. For example, the signal processor 404 changes the dimming signal 428 from a logic low level to a logic high level (e.g., at $t_1$ as shown by the waveform 506). In another example, during the on-time period $T_{on\_k+1}$, the voltage signal 374 (e.g., $V_{bulk}$) decreases in magnitude over time to the low magnitude 512 (e.g., at $t_2$ as shown by the waveform 502), and keeps at the low magnitude 512 between $t_2$ and $t_3$. In yet another example, the system controller 302 outputs the signal 378 which changes between the logic low level and the logic high level at a first modulation frequency during the on-time period $T_{on\_k+1}$ (e.g., as shown by the waveform 510). In yet another example, the signal 378 keeps at the logic low level during the off-time period $T_{off\_k+2}$ (e.g., as shown by the waveform 510).

According to yet another embodiment, at the beginning of the on-time period $T_{on\_k+2}$ (e.g., at $t_3$), the voltage signal 374 (e.g., $V_{bulk}$) changes from the low magnitude 512 to the large magnitude 514 again. In yet another example, the signal processor 404 changes the dimming signal 428 from the logic low level to the logic high level (e.g., at $t_3$ as shown by the waveform 506). In another example, during the on-time period $T_{on\_k+2}$, the voltage signal 374 (e.g., $V_{bulk}$) decreases in magnitude over time to the low magnitude 512 (e.g., at $t_4$ as shown by the waveform 502), and keeps at the low magnitude 512 between $t_4$ and $t_5$. In yet another example, the system controller 302 outputs the signal 378 which changes between the logic low level and the logic high level at a second modulation frequency during the on-time period $T_{on\_k+2}$ (e.g., as shown by the waveform 510). In yet another example, the signal 378 keeps at the logic low level during the off-time period $T_{off\_k+3}$ (e.g., as shown by the waveform 510).

According to yet another embodiment, at the beginning of the on-time period $T_{on\_k+3}$ (e.g., at $t_5$), the voltage signal 374 (e.g., $V_{bulk}$) changes from the low magnitude 512 to the large magnitude 514 again (e.g., as shown by the waveform 502). For example, during the on-time period (e.g., $T_{on\_k+3}$), the voltage signal 374 (e.g., $V_{bulk}$) decreases in magnitude over time to the low magnitude 512 (e.g., at $t_7$ as shown by the waveform 502). In another example, the signal processor 404 changes the dimming signal 428 from the logic low level to the logic high level at $t_6$. In yet another example, the signal processor 404 keeps the dimming signal 428 at the logic high level during the time period corresponding to a pulse width $T_{\phi k+3}$ (e.g., between $t_6$ and $t_7$ as shown by the waveform 506). In yet another example, the system controller 302 keeps the signal 378 at the logic high level between $t_5$ and $t_6$. In yet another example, the system controller 302 changes the signal 378 between the logic low level and the logic high level at a third modulation frequency during the time period corresponding to the pulse width $T_{\phi k+3}$ (e.g., as shown by the waveform 510). In yet another example, the signal 378 keeps at the logic low level during the off-time period $T_{off\_k+3}$ (e.g., as shown by the waveform 510). Only during the time periods corresponding to the pulse widths associated with the dimming signal 428, the system controller 302 is configured to modulate the signal 378 to regulate the output current 398, in some embodiments.

According to yet another embodiment, the signal processor 404 records and compares the phase angles of the voltage signal 374 associated with four consecutive periods, and selects a smallest phase angle. Then, the signal processor 404 outputs the dimming signal 428 based on at least information associated with the smallest phase angle, according to some embodiments. For example, in operation, if the dimming signal 428 is at the logic low level, the signal 480 is at the logic high level, and if the dimming signal 428 is at the logic high level, the signal 480 is at the logic low level (e.g., as shown by the waveforms 506 and 508).

In one embodiment, the signal processor 404 records and compares the on-time periods $T_{on\_k+1}$ and $T_{on\_k+2}$ of the voltage signal 374 associated with a first period (e.g., $T_{k+1}$ between $t_0$ and $t_2$) and a second period (e.g., $T_{k+2}$ between $t_2$ and $t_4$) respectively. For example, during the first period, the signal processor 404 outputs a first pulse in the dimming signal 428 with a pulse width $T_{\phi k+1}$ (e.g., between $t_1$ and $t_2$)

corresponding to the on-time period $T_{on\_k+1}$ (e.g., as shown by the waveform 506). During the second period, the signal processor 404 outputs another pulse in the dimming signal 428 with a pulse width $T_{\phi k+2}$ (e.g., between $t_3$ and $t_4$) corresponding to the on-time period $T_{on\_k+2}$ (e.g., as shown by the waveform 506). As an example, the signal processor 404 determines that the on-time period $T_{on\_k+2}$ is smaller than the on-time period $T_{on\_k+1}$ and selects the on-time period $T_{on\_k+2}$ as a smallest on-time period. Then, the signal processor 404 compares the on-time period $T_{on\_k+2}$ with a next on-time period $T_{on\_k+3}$ associated with a third period (e.g., $T_{k+3}$ between $t_4$ and $t_7$), as an example. If the on-time period $T_{on\_k+3}$ is longer than the on-time period $T_{on\_k+2}$, the signal processor 404 outputs a pulse in the dimming signal 428 with a pulse width (e.g., $T_{on\_k+3}$ between $t_6$ and $t_7$) corresponding to the on-time period $T_{on\_k+2}$ instead of the on-time period $T_{on\_k+3}$ during the third period $T_{k+3}$ (e.g., as shown by the waveform 506), according to certain embodiments. On the other hand, if the on-time period $T_{on\_k+3}$ is smaller than the on-time period $T_{on\_k+2}$, the signal processor 404 would output a pulse in the dimming signal 428 with a pulse width corresponding to the on-time period $T_{on\_k+3}$ during the third period, according to some embodiments.

Figure 9:
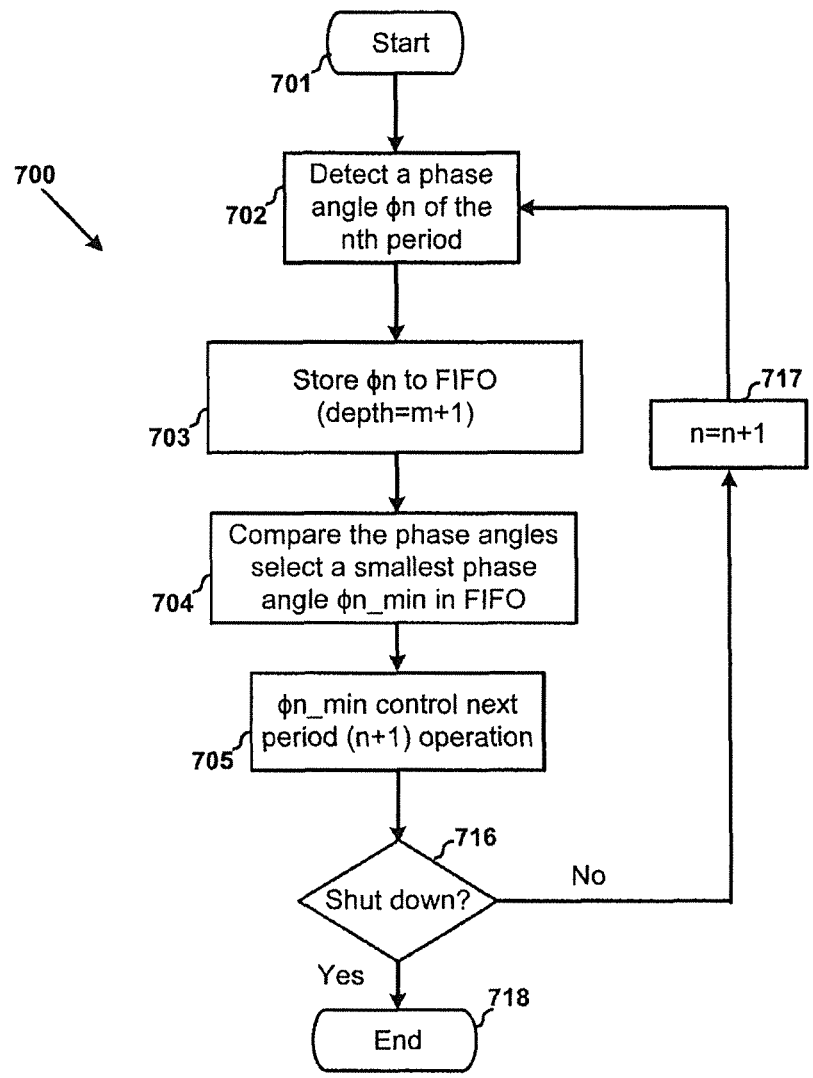
FIG. 9 is a simplified flow diagram showing a method for phase-angle determination for the system controller as shown in FIG. 7 according to an embodiment of the present invention.

FIG. 9 is a simplified flow diagram showing a method for phase-angle determination for the system controller 302 according to an embodiment of the present invention. This diagram is merely an example, which should not unduly limit the scope of the claims. One of ordinary skill in the art would recognize many variations, alternatives, and modifications. The method 700 includes the processes 701, 702, 703, 704, 705, 716, 717, and 718.

According to one embodiment, during the process 701, the system controller 302 is activated. For example, in response to the voltage signal 376 exceeding the UVLO threshold voltage, the system controller 302 is activated and outputs the control signal 378 to close (e.g., to turn on) or open (e.g., to turn off) the switch 352 (e.g., a transistor). In another example, during the process 702, the system controller 302 detects a phase angle (e.g., $\phi_n$) that is associated with a period (e.g., the $n^{th}$ period) of the voltage signal 374 and/or is associated with a period (e.g., the $n^{th}$ period) of the voltage signal 379. In yet another example, during the process 703, the detected phase angle (e.g., $\phi_n$) is stored in a queue that operates in a first-in-first-out (FIFO) manner. In yet another example, the queue has a depth equal to m+1 (e.g., m is an integer larger than or equal to 0), and is used to store up to m+1 phase angles (e.g., $\phi_{n-m}, \phi_{n-m+1}, \ldots, \phi_n$).

In one embodiment, during the process 704, if the queue stores m+1 phase angles, the system controller 302 compares the stored m+1 phase angles (e.g., $\phi_{n-m}, \phi_{n-m+1}, \ldots, \phi_n$), and determines a smallest phase angle (e.g., $\phi_{n\_min}$ corresponding to the $n^{th}$ period) to be equal to the smallest value of the stored m+1 phase angles (e.g., $\phi_{n-m}, \phi_{n-m+1}, \ldots, \phi_n$). In another embodiment, during the process 704, if the queue stores less than m+1 phase angles, the system controller 302 compares the stored phase angles and determines the smallest phase angle (e.g., $\phi_{n\_min}$ corresponding to the $n^{th}$ period) to be equal to the smallest value of the stored phase angles. For example, if m is equal to zero, the queue stores only one phase angle (e.g., $\phi_n$), and the system controller 302 determines the smallest phase angle (e.g., $\phi_{n\_min}$ corresponding to the $n^{th}$ period) to be equal to the stored phase angle (e.g., $\phi_n$).

According to certain embodiments, during the process 705, the system controller 302 uses the smallest phase angle (e.g., $\phi_{n\_min}$ corresponding to the $n^{th}$ period) to determine a modulation period that is associated with a next period (e.g., the $(n+1)^{th}$ period) of the voltage signal 374 and/or is associated with a next period (e.g., the $(n+1)^{th}$ period) of the voltage signal 379.

In one embodiment, if the phase angle (e.g., $\phi_{n+1}$) that is associated with the next period (e.g., the $(n+1)^{th}$ period) is equal to or larger than the smallest phase angle (e.g., $\phi_{n\_min}$ corresponding to the $n^{th}$ period), the system controller 302 uses the smallest phase angle (e.g., $(N_{n\_min})$ to determine a modulation period for the next period (e.g., the $(n+1)^{th}$ period). For example, during the modulation period (e.g., $T_{m1}$, $T_{m2}$, $T_{m3}$, or $T_{m4}$ as shown in FIG. 8), the system controller 302 outputs the control signal 378 to close (e.g., to turn on) and open (e.g., to turn off) the switch 352 at a modulation frequency during the modulation period but keep the control signal 378 at a constant logic level (e.g., a logic low level) without modulation during the rest of the $(n+1)^{th}$ period.

Referring to FIG. 8, a modulation period $T_{m1}$ corresponds to the phase angle $\phi_{k+1}$ associated with the period $T_{k+1}$ of the voltage signal 374 (e.g., $V_{bulk}$) and/or of the voltage signal 379, a modulation period $T_{m2}$ corresponds to the phase angle $\phi_{k+2}$ associated with the period $T_{k+2}$ of the voltage signal 374 (e.g., $V_{bulk}$) and/or of the voltage signal 379, and a modulation period $T_{m3}$ corresponds to the phase angle $\phi_{k+3}$ associated with the period $T_{k+3}$ of the voltage signal 374 (e.g., $V_{bulk}$) and/or of the voltage signal 379 according to some embodiments. Returning to FIG. 9(A), in another embodiment, if the phase angle (e.g., $\phi_{n+1}$) that is associated with the next period (e.g., the $(n+1)^{th}$ period) is smaller than the smallest phase angle (e.g., $\phi_{n\_min}$ corresponding to the $n^{th}$ period), the system controller 302 also uses the smallest phase angle $\phi_{n\_min}$ to determine a modulation period for the next period (e.g., the $(n+1)^{th}$ period). For example, the system controller 302 outputs the control signal 378 at a modulation frequency to the switch 352 during the modulation period, but keeps the control signal 378 at a constant logic level (e.g., a logic low level) without modulation during the rest of the $(n+1)^{th}$ period. In another example, the phase angle (e.g., $\phi_{n+1}$) corresponds to an on-time period (e.g., $T_{on\_n+1}$) that is smaller than the modulation period for the next period (e.g., the $(n+1)^{th}$ period). During the on-time period, the control signal 378 is used to close (e.g., to turn on) and open (e.g., to turn off) the switch 352 at the modulation frequency according to one embodiment. During the rest of the modulation period, the voltage signal 374 (e.g., $V_{bulk}$) and/or of the voltage signal 379 has a low magnitude, and thus the switch 352 does not close and open at the modulation frequency in response to the control signal 378 according to another embodiment.

During the process 716, the system controller 302 is configured to determine whether the system 300 is to be shut down according to certain embodiments. In one embodiment, if the system 300 needs to be shut down, the operations end and the system 300 is shut down during the process 718. In another embodiment, if the system 300 does not need to be shut down, the system controller 302 is configured to increase a counter parameter by 1 (e.g., increasing the counter parameter from n to n+1) during the process 717, and then the process 702 is executed to continue the operations. For example, the counter parameter n is associated with the $n^{th}$ period of the voltage signal 374 (e.g., $V_{bulk}$) and/or of the voltage signal 379. In another example, the counter parameter n+1 is associated with the $(n+1)^{th}$ period of the voltage signal 374 (e.g., $V_{bulk}$) and/or of the voltage signal 379.

According to certain embodiments, during the process 702, the system controller 302 detects the phase angle (e.g., $\phi_{n+1}$) that is associated with the next period (e.g., the $(n+1)^{th}$ period) of the voltage signal 374 (e.g., $V_{bulk}$) and/or is associated with the next period (e.g., the $(n+1)^{th}$ period) of the voltage signal 379. For example, during the process 703, the detected phase angle (e.g., ($\phi_{n+1}$) is stored into the queue that operates in the FIFO manner. If the queue has stored m+1 phase angles (e.g., $\phi_{n-m}, \phi_{n-m+1}, \ldots, \phi_n$) already, the phase angle (e.g., $\phi_{n-m}$) stored at the front end of the queue is removed, and the detected phase angle (e.g., $\phi_{n+1}$) is stored to the rear end of the queue.

In one example, during the process 704, if the queue stores m+1 phase angles, the system controller 302 compares the stored m+1 phase angles (e.g., $\phi_{n-m+1}, \phi_{n-m+2}, \ldots, \phi_{n+1}$), and determines a smallest phase angle (e.g., $\phi_{n+1\_min}$ corresponding to the $(n+1)^{th}$ period) to be equal to the smallest value of the stored m+1 phase angles (e.g., $\phi_{n-m+1}, \phi_{n-m+2}, \ldots, \phi_{n+1}$). In another embodiment, during the process 704, if the queue stores less than m+1 phase angles, the system controller 302 compares the stored phase angles and determines the smallest phase angle (e.g., $\phi_{n+1\_min}$ corresponding to the $(n+1)^{th}$ period) to be equal to the smallest value of the stored phase angles.

According to some embodiments, during the process 705, the system controller 302 uses the smallest phase angle (e.g., $\phi_{n+1\_min}$ corresponding to the $(n+1)^{th}$ period) to determine a modulation period that is associated with a subsequent period (e.g., the $(n+2)^{th}$ period) of the voltage signal 374 (e.g., $V_{bulk}$) and/or is associated with a subsequent period (e.g., the $(n+2)^{th}$ period) of the voltage signal 379. For example, during the modulation period (e.g., $T_{m1}, T_{m2}, T_{m3}$, or $T_{m4}$ as shown in FIG. 8), the system controller 302 outputs the control signal 378 to close (e.g., to turn on) and open (e.g., to turn off) the switch 352 at a modulation frequency during the modulation period but keep the control signal 378 at a constant logic level (e.g., a logic low level) without modulation during the rest of the $(n+2)^{th}$ period.

In one embodiment, if the phase angle (e.g., $\phi_{n+2}$) that is associated with the subsequent period (e.g., the $(n+2)^{th}$ period) of the voltage signal 374 (e.g., $V_{bulk}$) and/or is associated with the subsequent period (e.g., the $(n+2)^{th}$ period) of the voltage signal 379 is determined to be larger than the smallest phase angle (e.g., $\phi_{n+1\_min}$ corresponding to the $(n+1)^{th}$ period), the system controller 302 outputs the control signal 378 to close (e.g., to turn on) and open (e.g., to turn off) the switch 352 at a modulation frequency during the modulation period but keep the control signal 378 at a constant logic level (e.g., a logic low level) without modulation during the rest of the $(n+2)^{th}$ period.

In another embodiment, if the phase angle (e.g., $\phi_{n+2}$) that is associated with the subsequent period (e.g., the $(n+2)^{th}$ period) of the voltage signal 374 (e.g., $V_{bulk}$) and/or is associated with the subsequent period (e.g., the $(n+2)^{th}$ period) of the voltage signal 379 is smaller than the smallest phase angle (e.g., $\phi_{n+1\_min}$ corresponding to the $(n+1)^{th}$ period), the system controller 302 also uses the smallest phase angle $\phi_{n+1\_min}$ to determine a modulation period for the subsequent period (e.g., the $(n+2)^{th}$ period). For example, an on-time period $T_{on\_(N+2)}$ corresponding to the phase angle $\phi_{n+2}$ that is smaller in magnitude than the modulation period for the subsequent period (e.g., the $(n+2)^{th}$ period). During the on-time period $T_{on\_(N+2)}$, the control signal 378 is used to close (e.g., to turn on) and open (e.g., to turn off) the switch 352 at the modulation frequency according to one embodiment. During the rest of the modulation period, the voltage signal 374 (e.g., $V_{bulk}$) and/or of the voltage signal 379 has a low magnitude, and thus the switch 352 does not close and open at the modulation frequency in response to the control signal 378 according to another embodiment.

According to one embodiment, during the process 702, the system controller 302 detects an on-time period (e.g., $T_{on\_N}$) that is associated with a period (e.g., the $N^{th}$ period) of the voltage signal 374 (e.g., $V_{bulk}$) and/or is associated with a period (e.g., the $N^{th}$ period) of the voltage signal 379. In yet another example, during the process 703, the detected on-time period (e.g., $T_{on\_N}$) is stored in a queue that operates in a first-in-first-out (FIFO) manner. In yet another example, the queue has a depth m+1 (e.g., m is an integer larger than or equal to 0), and is used to store up to m+1 on-time periods (e.g., $T_{on\_N-m}, T_{on\_N-m+1}, \ldots, T_{on\_N}$).

In one embodiment, during the process 704, if the queue stores m+1 on-time periods, the system controller 302 compares the stored m+1 on-time periods (e.g., $T_{on\_N-m}, T_{on\_N-m+1}, \ldots, T_{on\_N}$), and determines a smallest on-time period (e.g., $T_{on\_N\_min}$ corresponding to the $N^{th}$ period) to be equal to the smallest value of the stored m+1 on-time periods (e.g., $T_{on\_N-m}, T_{on\_N-m+1}, \ldots, T_{on\_N}$). In another embodiment, during the process 704, if the queue stores less than m+1 on-time periods, the system controller 302 compares the stored on-time periods and determines the smallest on-time period (e.g., $T_{on\_N\_min}$ corresponding to the $N^{th}$ period) to be equal to the smallest value of the stored on-time periods. For example, if m is equal to zero, the queue stores only one on-time period (e.g., $T_{on\_N}$), and the system controller 302 determines the smallest on-time period (e.g., $T_{on\_N\_min}$ corresponding to the $N^{th}$ period) to be equal to the stored on-time period (e.g., $T_{on\_N}$).

According to certain embodiments, during the process 705, the system controller 302 uses the smallest on-time period (e.g., $T_{on\_N\_min}$ corresponding to the $N^{th}$ period) to determine a modulation period that is associated with a next period (e.g., the $(N+1)^{th}$ period) of the voltage signal 374 and/or a next period (e.g., the $(N+1)^{th}$ period) of the voltage signal 379.

In one embodiment, if the on-time period (e.g., $T_{on\_N+1}$) that is associated with the next period (e.g., the $(N+1)^{th}$ period) of the voltage signal 374 and/or is associated with the next period (e.g., the $(N+1)^{th}$ period) of the voltage signal 379 is determined to be larger than the smallest on-time period (e.g., $T_{on\_N\_min}$ corresponding to the $N^{th}$ period), the system controller 302 uses the smallest on-time period (e.g., $T_{on\_N\_min}$ corresponding to the $N^{th}$ period) to determine the modulation period for the next period (e.g., the $(N+1)^{th}$ period). For example, during the modulation period (e.g., $T_{m1}, T_{m2}, T_{m3}$, or $T_{m4}$ as shown in FIG. 8), the system controller 302 outputs the control signal 378 to close (e.g., to turn on) and open (e.g., to turn off) the switch 352 at a modulation frequency during the modulation period but keep the control signal 378 at a constant logic level (e.g., a logic low level) without modulation during the rest of the $(N+1)^{th}$ period.

Referring to FIG. 8, the modulation period $T_{m1}$ corresponds to the on-time period $T_{on\_1}$ associated with the $1^{st}$ period of the voltage signal 374 (e.g., $V_{bulk}$) and/or the $1^{st}$ period of the voltage signal 379, the modulation period $T_{m2}$ corresponds to the on-time period $T_{on\_2}$ associated with the $2^{nd}$ period of the voltage signal 374 (e.g., $V_{bulk}$) and/or the $2^{nd}$ period of the voltage signal 379, and the modulation period $T_{m3}$ corresponds to the on-time period $T_{on\_3}$ associated with the $3^{rd}$ period of the voltage signal 374 (e.g., $V_{bulk}$) and/or the $3^{rd}$ period of the voltage signal 379, according to some embodiments. In another embodiment, during the modulation period, the system controller 302 outputs the control signal 378 at a modulation frequency, but keeps the control signal 378 at a constant logic level (e.g., a logic low level) without modulation during the rest of the $(N+1)^{th}$ period. For example, if the on-time period (e.g., $T_{on\_N+1}$) that is associated with the next period (e.g., the $(N+1)^{th}$ period) of the voltage signal 374 (e.g., $V_{bulk}$) and/or is associated with the next period (e.g., the $(N+1)^{th}$ period) of the voltage signal 379 is smaller than the smallest on-time period (e.g., $T_{on\_N\_min}$ corresponding to the $N^{th}$ period), the system controller 302 also uses the smallest on time period $T_{on\_N\_min}$ to determine a modulation period for the next period (e.g., the $(N+1)^{th}$ period). As an example, For example, the system controller 302 outputs the control signal 378 at a modulation frequency to the switch 352 during the modulation period, but keeps the control signal 378 at a constant logic level (e.g., a logic low level) without modulation during the rest of the $(N+1)^{th}$ period. During the on-time period (e.g., $T_{on\_N+1}$), the control signal 378 is used to close (e.g., to turn on) and open (e.g., to turn off) the switch 352 at the modulation frequency according to one embodiment. During the rest of the modulation period, the voltage signal 374 and/or of the voltage signal 379 has a low magnitude, and thus the switch 352 does not close and open at the modulation frequency in response to the control signal 378 according to another embodiment During the process 716, the system controller 302 is configured to determine whether the system 300 is to be shut down according to certain embodiments. In one embodiment, if the system 300 needs to be shut down, the operations end and the system 300 is shut down during the process 718. In another embodiment, if the system 300 does not need to be shut down, the system controller 302 is configured to increase a counter parameter by 1 (e.g., increasing the counter parameter from N to N+1), during the process 717, and the process 702 is executed to continue the operations. For example, the counter parameter N is associated with the $N^{th}$ period of the voltage signal 374 (e.g., $V_{bulk}$) and/or of the voltage signal 379. In another example, the counter parameter N+1 is associated with the $(N+1)^{th}$ period of the voltage signal 374 (e.g., $V_{bulk}$) and/or of the voltage signal 379.

According to some embodiments, during the process 702, the system controller 302 detects the on-time period (e.g., $T_{on\_N+1}$) that is associated with the next period (e.g., the $(N+1)^{th}$ period) of the voltage signal 374 and/or is associated with the next period (e.g., the $(N+1)^{th}$ period) of the voltage signal 379. For example, during the process 703, the detected on-time period (e.g., $T_{on\_N+1}$) is stored into the queue that operates in the FIFO manner. If the queue has stored m+1 on-time periods (e.g., $T_{on\_N-m}$, $T_{on\_N-m+1}$, ..., $T_{on\_N}$) already, the on-time period (e.g., $T_{on\_N-m}$) stored at the front end of the queue is removed, and the detected on-time period (e.g., $T_{on\_N+1}$) is stored to the rear end of the queue.

In one embodiment, during the process 704, if the queue stores m+1 on-time periods, the system controller 302 compares the stored m+1 on-time periods (e.g., $T_{on\_N-m+1}$, $T_{on\_N-m+2}$, ..., $T_{on\_N+1}$), and determines a smallest on-time period (e.g., $T_{on\_N+1\_min}$ corresponding to the $(N+1)^{th}$ period) to be equal to the smallest value of the stored m+1 on-time periods (e.g., $T_{on\_N-m+1}$, $T_{on\_N-m+2}$, ..., $T_{on\_N+1}$). In another embodiment, during the process 704, if the queue stores less than m+1 on-time periods, the system controller 302 compares the stored on-time periods and determines the smallest on-time period (e.g., $T_{on\_N+1\_min}$ corresponding to the $(N+1)^{th}$ period) to be equal to the smallest value of the stored on-time periods.

According to certain embodiments, during the process 705, the system controller 302 uses the smallest on-time period (e.g., $T_{on\_N+1\_min}$ corresponding to the $(N+1)^{th}$ period) to determine a modulation period that is associated with a subsequent period (e.g., the $(N+2)^{th}$ period) of the voltage signal 374 and/or is associated with a subsequent period (e.g., the $(N+2)^{th}$ period) of the voltage signal 379. For example, during the modulation period (e.g., $T_{m1}$, $T_{m2}$, $T_{m3}$, or $T_{m4}$ as shown in FIG. 8), the system controller 302 outputs the control signal 378 to close (e.g., to turn on) and open (e.g., to turn off) the switch 352 at a modulation frequency during the modulation period but keep the control signal 378 at a constant logic level (e.g., a logic low level) without modulation during the rest of the $(N+2)^{th}$ period.

In one embodiment, if the on-time period (e.g., $T_{on\_(N+2)}$) that is associated with the subsequent period (e.g., the $(N+2)^{th}$ period) of the voltage signal 374 (e.g., $V_{bulk}$) and/or is associated with the subsequent period (e.g., the $(N+2)^{th}$ period) of the voltage signal 379 is determined to be larger than the smallest on-time period (e.g., $T_{on\_N+1\_min}$ corresponding to the $(N+1)^{th}$ period), the system controller 302 outputs the control signal 378 to close (e.g., to turn on) and open (e.g., to turn off) the switch 352 at a modulation frequency during the modulation period and keep the control signal 378 at a constant logic level (e.g., a logic low level) without modulation during the rest of the $(N+2)^{th}$ period.

In another embodiment, if the on-time period (e.g., $T_{on\_(N+2)}$) that is associated with the subsequent period (e.g., the $(N+2)^{th}$ period) of the voltage signal 374 and/or is associated with the subsequent period (e.g., the $(N+2)^{th}$ period) of the voltage signal 379 is smaller than the smallest on-time period (e.g., $T_{on\_N+1\_min}$ corresponding to the $(N+1)^{th}$ period), the system controller 302 also uses the smallest on-time period $T_{on\_N+1\_min}$ to determine a modulation period for the subsequent period (e.g., the $(N+2)^{th}$ period). During the on-time period $T_{on\_(N+2)}$, the control signal 378 is used to close (e.g., to turn on) and open (e.g., to turn off) the switch 352 at the modulation frequency according to one embodiment. During the rest of the modulation period, the voltage signal 374 and/or of the voltage signal 379 has a low magnitude, and thus the switch 352 does not close and open at the modulation frequency in response to the control signal 378 according to another embodiment.

As discussed above and further emphasized here, FIG. 9(A) is merely an example, which should not unduly limit the scope of the claims. One of ordinary skill in the art would recognize many variations, alternatives, and modifications. In one embodiment, if the $(n+1)^{th}$ period of the voltage signal 374 and/or the $(n+1)^{th}$ period of the voltage signal 379 is the first period, the system controller 302 skips the method 700 and uses the phase angle $\phi_{n+1}$ to determine a modulation period for the $(n+1)^{th}$ period. In another embodiment, if n is smaller than m+1, the processes 704 and 705 are skipped. For example, if n is smaller than m+1, after the processes 701, 702, and 703 are performed, the system controller 302 uses the phase angle $\phi_{k+1}$ to determine a modulation period for the $(n+1)^{th}$ period, and then performs the process 716, the process 718, and/or the process 717.

Figure 4:
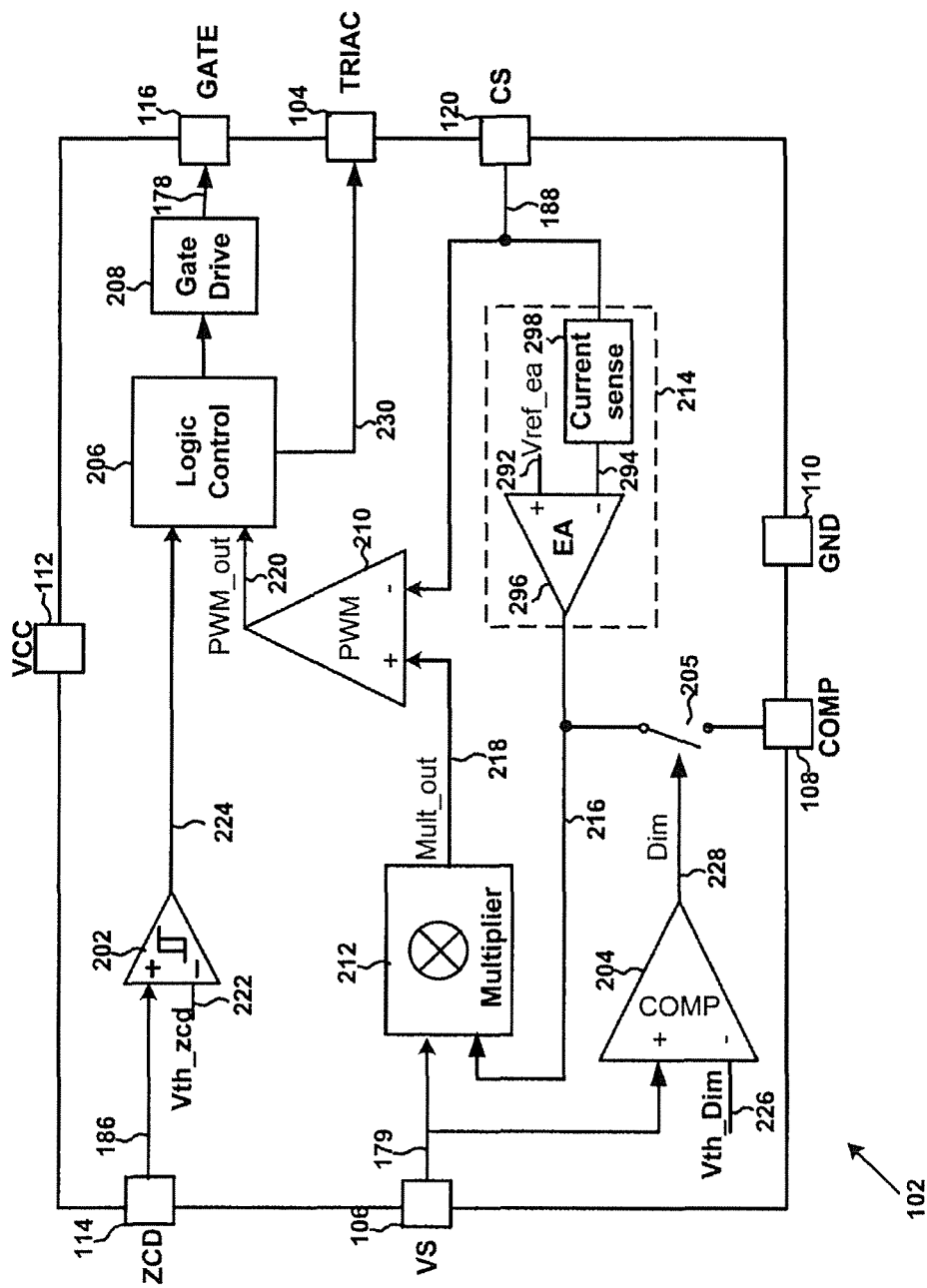
FIG. 4 is a simplified conventional diagram of the controller as shown in FIG. 1.
Figure 10:
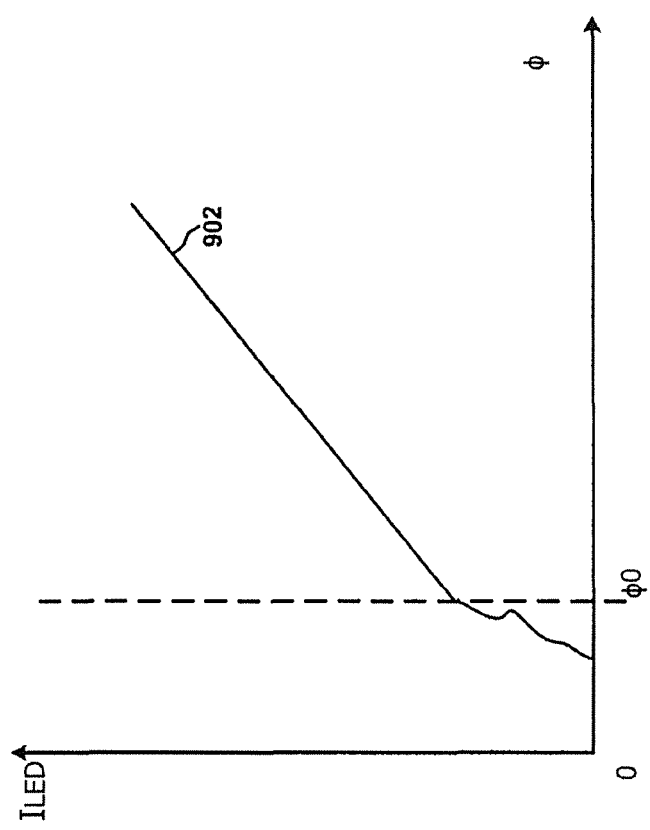
FIG. 10 shows a simplified diagram analyzing some disadvantages of the conventional LED lighting system as shown in FIG. 1.

FIG. 10 shows a simplified diagram for analyzing some disadvantages of the conventional LED lighting system 100. The waveform 902 represents the output current 198 as a function of a phase angle associated with the voltage signal 174. According to Equation 2, when the phase angle associated with the voltage signal 174 becomes too small, correspondingly the voltage signal 174 becomes too low in magnitude so that the system controller 102 cannot continue to operate normally to regulate the output current 198. As shown in FIG. 10, if the phase angle associated with the voltage signal 174 becomes smaller than a threshold $\phi_0$, the output current 198 decreases rapidly, so as to make it hard to achieve high-resolution dimming control. According to Equation 2 and FIG. 4, the reference signal 292 within the current regulation component 214 affects the output current 198. For example, the threshold $\phi_0$ is associated with the TRIAC dimmer 118.

Figure 11:
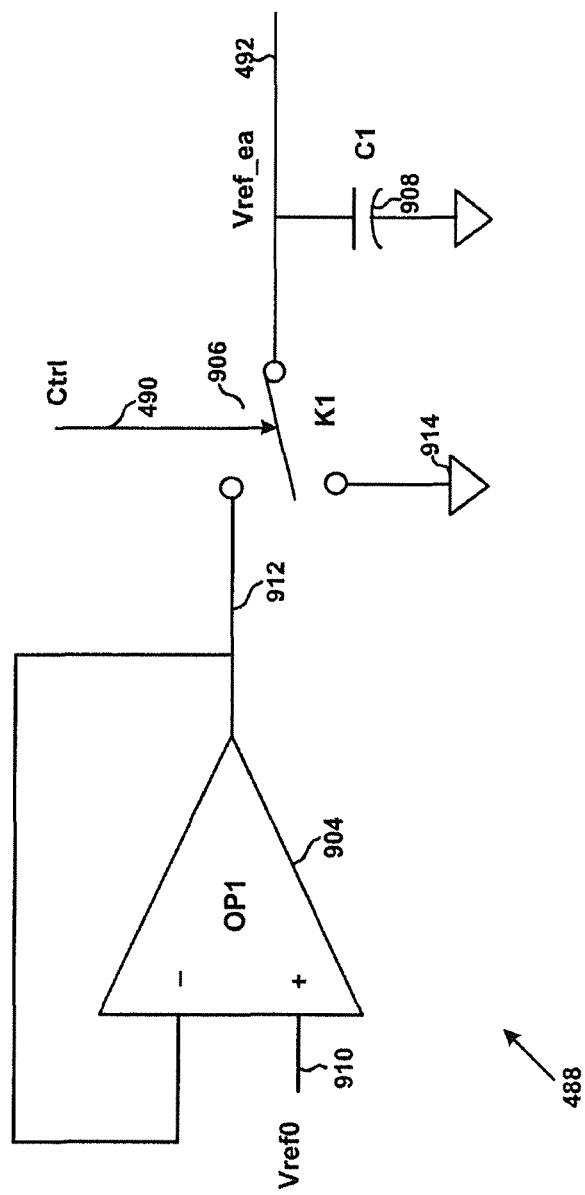
FIG. 11 is a simplified diagram showing a voltage modulator as part of the system controller as shown in FIG. 7 according to an embodiment of the present invention.

FIG. 11 is a simplified diagram showing the voltage modulator 488 as part of the system controller 302 according to an embodiment of the present invention. This diagram is merely an example, which should not unduly limit the scope of the claims. One of ordinary skill in the art would recognize many variations, alternatives, and modifications. The voltage modulator 488 includes an amplifier 904, a switch 906, and a capacitor 908.

According to one embodiment, the amplifier 904 receives an input signal 910 and outputs a signal 912. For example, the switch 906 is affected by the control signal 490. In another example, if the control signal 490 is at a first logic level (e.g., logic high), the switch 906 is configured to receive the signal 912 to charge the capacitor 908. In yet another example, if the control signal 490 is at a second logic level (e.g., logic low), the switch 906 is configured to receive a ground voltage 914 to discharge the capacitor 908. In yet another example, an average voltage on the capacitor 908 corresponds to the reference signal 492 which is determined as below:

$$V_{ref\_ea} = \text{Duty} \times V_{ref0} \quad \text{(Equation 3)}$$

where duty represents a duty cycle of the control signal 490, $V_{ref0}$ represents the input signal 910. As shown by Equation 3, if the signal processor 404 is configured to output the control signal 490 with a proper duty cycle at a particular frequency, the reference signal 492 can be precisely controlled, in some embodiments.

Figure 12:
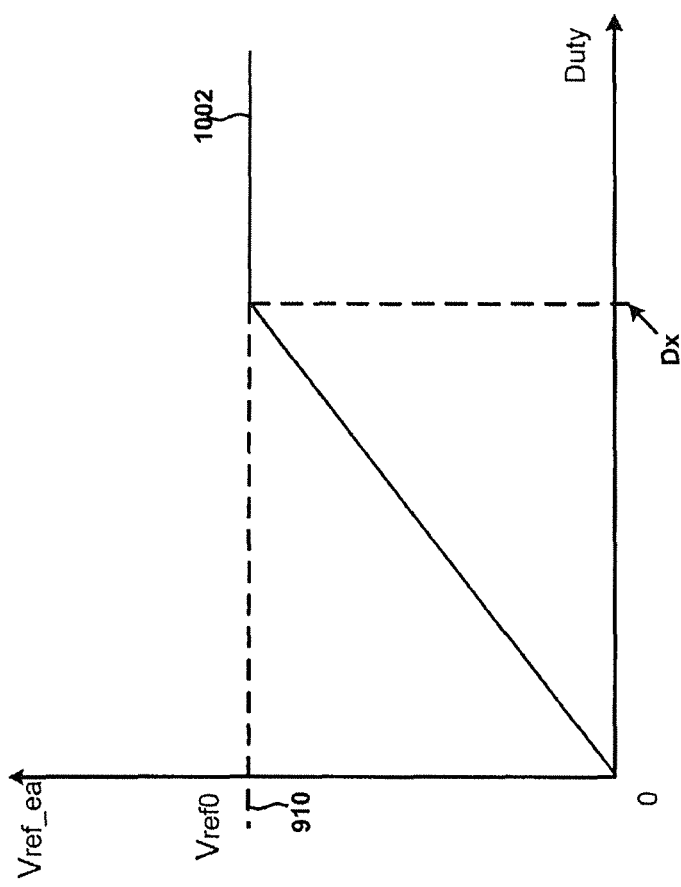
FIG. 12 is a simplified diagram showing a reference signal as a function of duty cycle for the voltage modulator as shown in FIG. 11 as part of the system controller as shown in FIG. 7 according to an embodiment of the present invention.

FIG. 12 is a simplified diagram showing the reference signal 492 as a function of duty cycle for the voltage modulator 488 as shown in FIG. 11 as part of the system controller 302 according to an embodiment of the present invention. This diagram is merely an example, which should not unduly limit the scope of the claims. One of ordinary skill in the art would recognize many variations, alternatives, and modifications. The waveform 1002 represents the reference signal 492 as a function of the duty cycle of the control signal 490.

According to one embodiment, if the duty cycle of the control signal 490 is equal to or larger than a threshold $D_x$, the reference signal 492 is approximately equal to the input signal 910 in magnitude. For example, if the duty cycle of the control signal 490 is between 0 and the threshold $D_x$, the reference signal 492 decreases (e.g., linearly or non-linearly) in magnitude with the duty cycle of the control signal 490 decreasing. In another example, when the duty cycle of the control signal 490 decreases to a small magnitude (e.g., 0), the reference signal 492 decreases to a small magnitude (e.g., 0). As shown by Equation 3 and FIG. 12, if the signal processor 404 is configured to output the control signal 490 with a proper duty cycle at a particular frequency, the reference signal 492 can be precisely controlled, in some embodiments.

According to another embodiment, the signal process 404 is configured to output the control signal 490 based on at least information associated with the signal 379 which relates to the voltage signal 374. For example, the signal process 404 is configured to output the control signal 490 based on at least information associated with the phase angle of the voltage signal 374. As an example, the phase angle of the voltage signal 374 corresponds to the duty cycle of the control signal 490.

Figure 13:
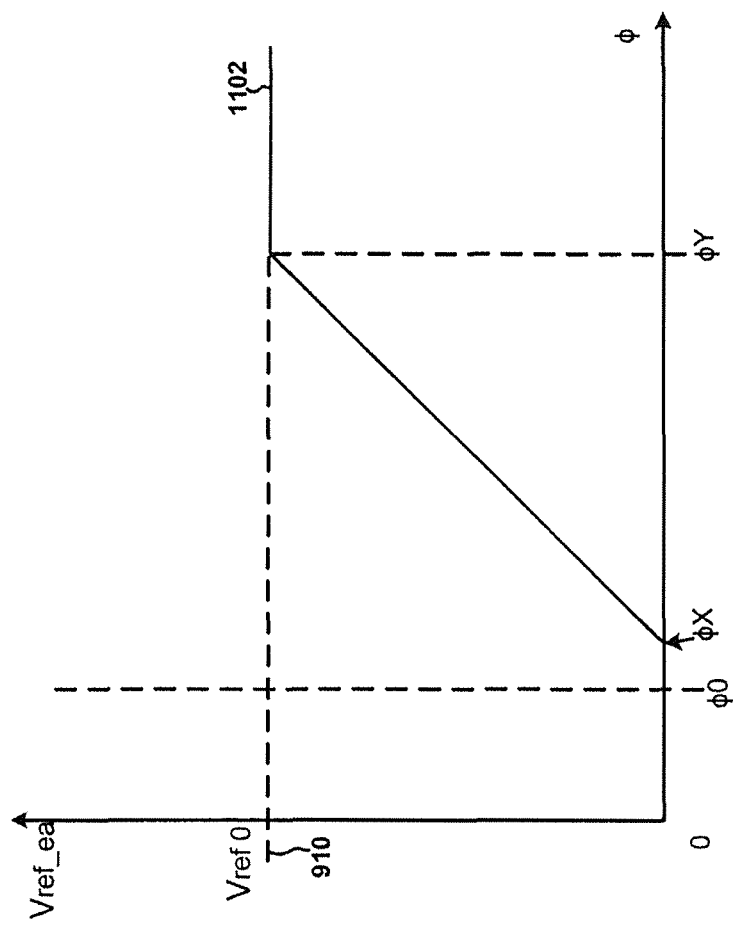
FIG. 13 is a simplified diagram showing a reference signal as a function of phase angle for the voltage modulator as shown in FIG. 11 as part of the system controller as shown in FIG. 7 according to an embodiment of the present invention.

FIG. 13 is a simplified diagram showing the reference signal 492 as a function of phase angle for the voltage modulator 488 as shown in FIG. 11 as part of the system controller 302 according to an embodiment of the present invention. This diagram is merely an example, which should not unduly limit the scope of the claims. One of ordinary skill in the art would recognize many variations, alternatives, and modifications. The waveform 1102 represents the reference signal 492 as a function of the phase angle of the voltage signal 374 and/or the phase angle of the voltage signal 379.

According to one embodiment, if the phase angle of the voltage signal 374 and/or the phase angle of the voltage signal 379 are equal to or larger than a first threshold $\phi_Y$, the reference signal 492 is approximately equal to the input signal 910 in magnitude. For example, if the phase angle of the voltage signal 374 and/or the phase angle of the voltage signal 374 are between a second threshold $\phi_X$ and the first threshold $\phi_Y$, the reference signal 492 decreases (e.g., linearly or non-linearly) in magnitude with the phase angle of the voltage signal 374 decreasing. As an example, the second threshold $\phi_X$ is larger than the threshold $\phi_0$. The signal processor 404 is configured to detect the phase angle of the voltage signal 374 based on at least information associated with the signal 379, and output the control signal 490 with a proper duty cycle at a particular frequency, so as to precisely control the reference signal 492, in some embodiments. For example, if the phase angle of the voltage signal 374 and/or the phase angle of the voltage signal 379 are larger than $\phi_Y$, the reference signal 492 keeps at a magnitude (e.g., $V_{ref0}$). In another example, if the phase angle of the voltage signal 374 and/or the phase angle of the voltage signal 379 are larger than $\phi_Y$, the reference signal 492 does not keep at a magnitude (e.g., $V_{ref0}$). In yet another example, the threshold $\phi_0$ is associated with the TRIAC dimmer 318. In yet another example, if the phase angle of the voltage signal 374 and/or the phase angle of the voltage signal 379 are smaller than the threshold $\phi_0$, the reference signal 492 changes to a small magnitude (e.g., 0). In yet another example, in response to the reference signal 492 changing to the small magnitude (e.g., 0), the system controller 302 is configured to change the control signal 378 to keep the switch 352 (e.g., M2) open (e.g., for a period of time) so that the output current 398 that flows through the LEDs 372 decreases to a small magnitude (e.g., 0).

Figure 14:
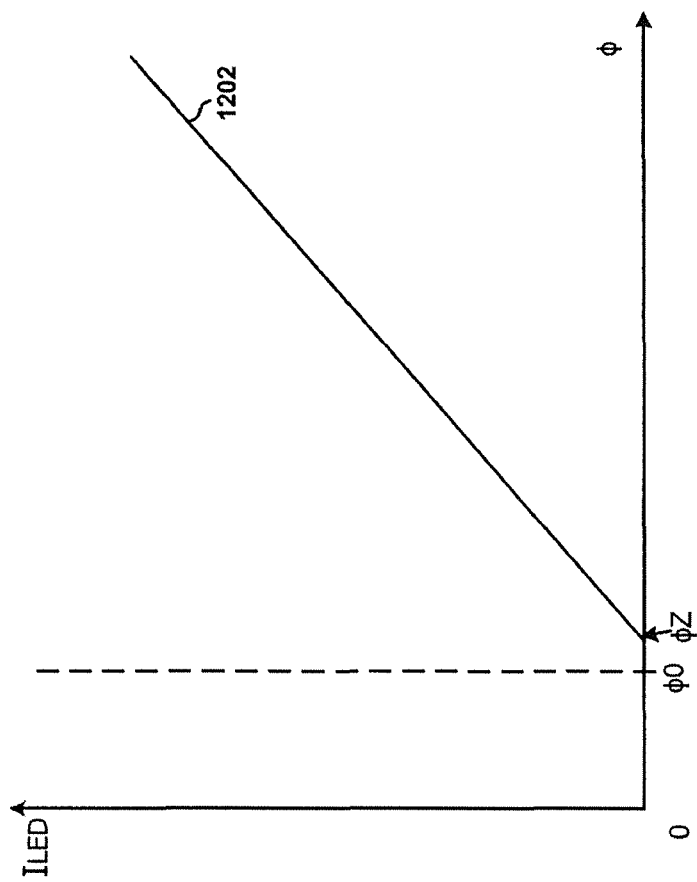
FIG. 14 is a simplified diagram showing an output current of the system as shown in FIG. 6 according to another embodiment of the present invention.

FIG. 14 is a simplified diagram showing the output current 398 of the system 300 according to another embodiment of the present invention. This diagram is merely an example, which should not unduly limit the scope of the claims. One of ordinary skill in the art would recognize many variations, alternatives, and modifications. The waveform 1202 represents the output current 398 as a function of the phase angle of the voltage signal 374 and/or the phase angle of the voltage signal 379.

According to one embodiment, the output current 398 decreases (e.g., linearly) with the phase angle of the voltage signal 374 and/or the phase angle of the voltage signal 379 decreasing. For example, the output current 398 decreases to a very small magnitude (e.g., approximately zero) when the phase angle of the voltage signal 374 and/or the phase angle of the voltage signal 379 decrease to a small magnitude $\phi_Z$ which is still larger than the threshold $\phi_0$. Over a wide range of the phase angle of the voltage signal 374 and/or the phase angle of the voltage signal 379, the output current 398 does not change rapidly and high-resolution dimming control can be achieved, in some embodiments. As an example, in order for the TRIAC dimmer 318 to operate normally, a bleeding current with a sufficient magnitude needs to be provided. As another example, if the phase angle φ is smaller than the threshold $φ_0$, the magnitude of the bleeding current may become too small for the TRIAC dimmer 318 to operate normally, which results in a rapid decrease of the output current 398 flowing through the LEDs 372.

As discussed above, and further emphasized here, FIG. 11, FIG. 12, FIG. 13 and FIG. 14 are merely examples, which should not unduly limit the scope of the claims. One of ordinary skill in the art would recognize many variations, alternatives, and modifications. For example, the output current 398 decreases (e.g., non-linearly) with the phase angle of the voltage signal 374 and/or the phase angle of the voltage signal 379 decreasing, as shown in FIG. 14.

Figure 15A:
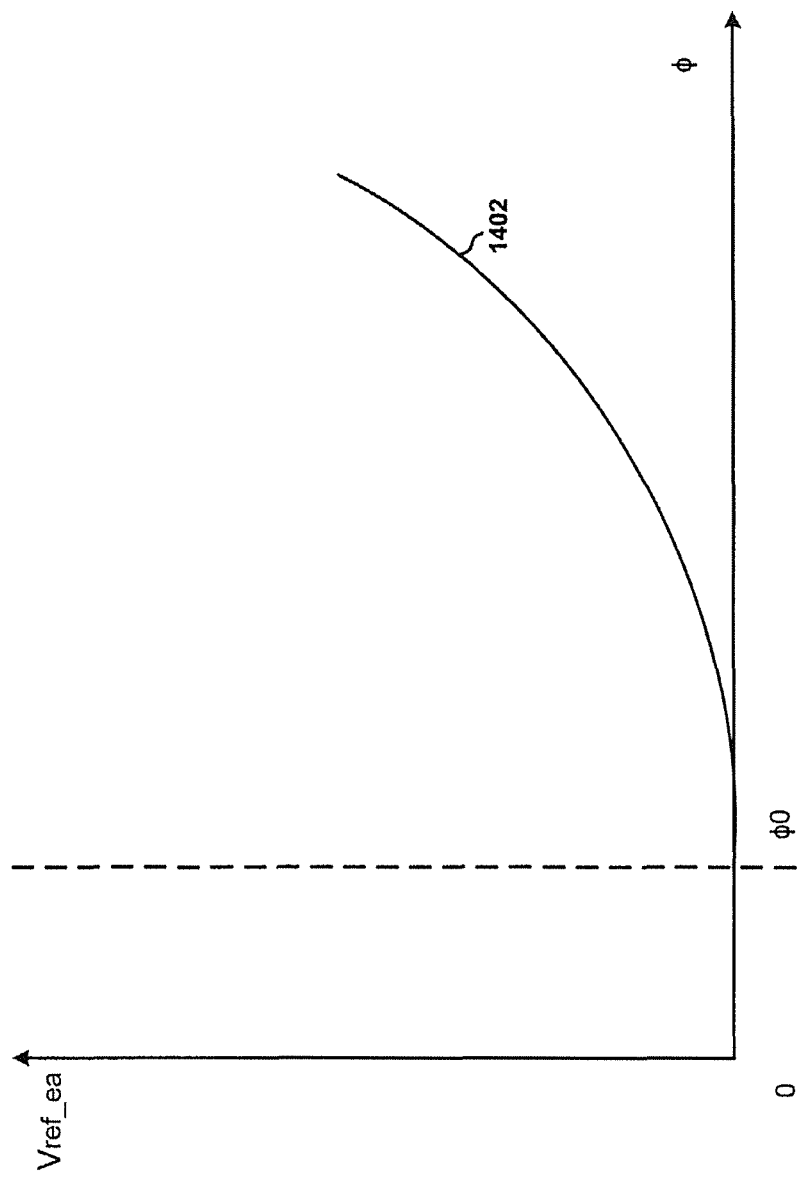
FIG. 15(A) is a simplified diagram showing a reference signal for the system controller as shown in FIG. 7
Figure 15B:
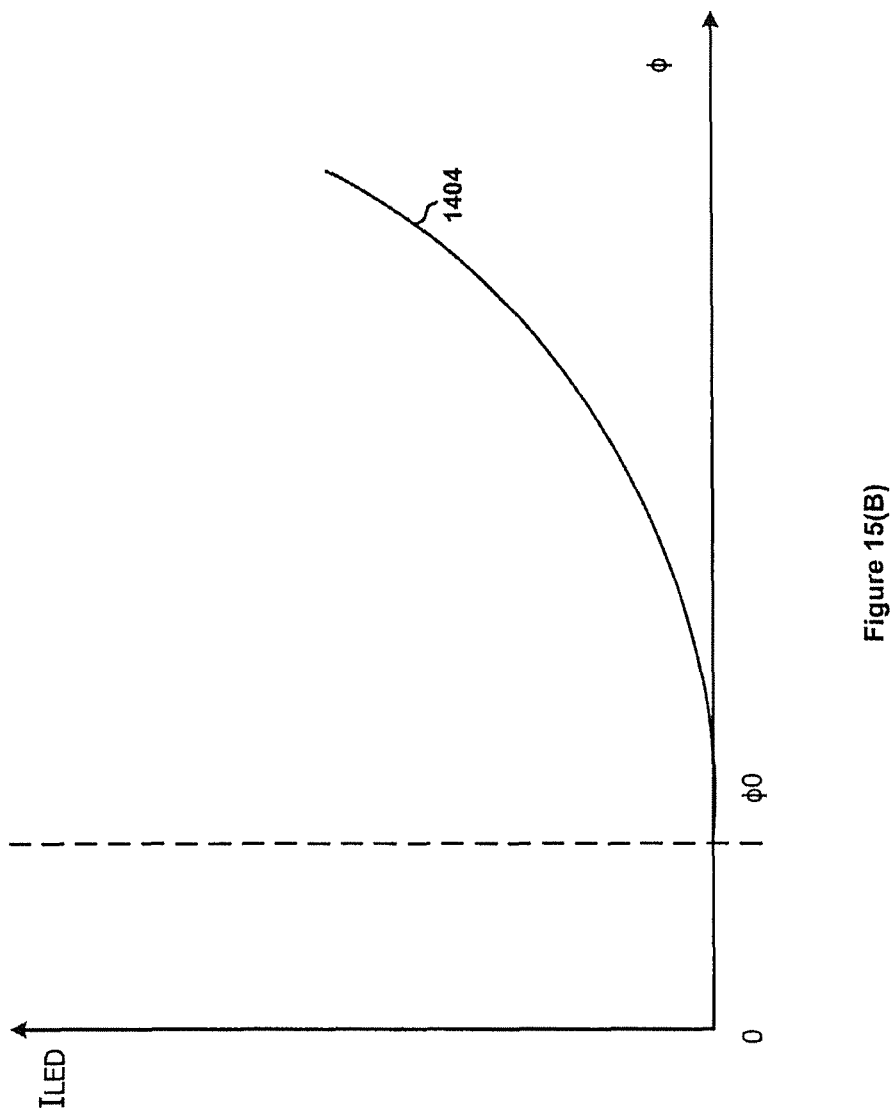
FIG. 15(B) is a simplified diagram showing an output current of the system as shown in FIG. 6 according to some embodiments of the present invention.

FIG. 15(A) is a simplified diagram showing the reference signal 492 for the system controller 302 and FIG. 15(B) is a simplified diagram showing the output current 398 of the system 300 according to some embodiments of the present invention. These diagrams are merely examples, which should not unduly limit the scope of the claims. One of ordinary skill in the art would recognize many variations, alternatives, and modifications. The waveform 1402 represents the reference signal 492 as a function of the phase angle of the voltage signal 374 and/or the phase angle of the voltage signal 379, and the waveform 1404 represents the output current 398 as a function of the phase angle of the voltage signal 374 and/or the phase angle of the voltage signal 379.

According to one embodiment, the signal processor 404 is configured to output the control signal 490 with a proper duty cycle at a particular frequency and controls the reference signal 492 to change non-linearly with the phase angle of the voltage signal 374 and/or the phase angle of the voltage signal 379 (e.g., as shown by the waveform 1402). For example, as the reference signal 492 affects the output current 398, the output current 398 change non-linearly with the phase angle of the voltage signal 374 and/or the phase angle of the voltage signal 379 (e.g., as shown by the waveform 1404). Thus, the brightness of the LEDs 372 changes linearly with the phase angle of the voltage signal 374 and/or the phase angle of the voltage signal 379 (e.g., as shown by the waveform 1306), in some embodiments.

FIG. 15(C) is a simplified diagram showing a relationship between the brightness of the LEDs 372 and the phase angle of the voltage signal 374 and/or the phase angle of the voltage signal 379 according to an embodiment of the present invention. This diagram is merely an example, which should not unduly limit the scope of the claims. One of ordinary skill in the art would recognize many variations, alternatives, and modifications. The waveform 1702 represents the brightness of the LEDs 372 as a function of the phase angle of the voltage signal 374 and/or the phase angle of the voltage signal 379.

As shown in FIG. 15(C), the brightness of the LEDs 372 should change linearly with the phase angle of the voltage signal 374 and/or the phase angle of the voltage signal 379 so that during the process of dimming control, the brightness of the LEDs 372 changes smoothly, according to some embodiments. For example, the brightness of the LEDs 372 is related to the luminance of the LEDs 372.

According to one embodiment, an apparatus for a power conversion system includes: a process-and-drive component configured to receive an input signal, process information associated with the input signal, and output a drive signal to a switch to affect a current that flows through a primary winding of a power conversion system. The input signal includes a first pulse associated with a first input period and a second pulse associated with a second input period. The drive signal is associated with a first modulation period for the first input period and a second modulation period for the second input period. The process-and-drive component is further configured to: determine the first modulation period for the first input period; change the drive signal between a first logic level and a second logic level at a modulation frequency during the first modulation period; determine the second modulation period for the second input period; and change the drive signal between the first logic level and the second logic level at the modulation frequency during the second modulation period. The first pulse corresponds to a first pulse width. The second pulse corresponds to a second pulse width. The first modulation period corresponds to a first duration. The second modulation period corresponds to a second duration. The first pulse width and the second pulse width are different in magnitude. The first duration and the second duration are equal in magnitude. For example, the apparatus is implemented according to at least FIG. 7 and/or FIG. 8.

According to another embodiment, an apparatus for a power conversion system includes: a process-and-drive component configured to receive an input signal, process information associated with the input signal, and output a drive signal to a switch to affect a current that flows through a primary winding of a power conversion system. The input signal includes one or more input pulses and a first input pulse, the one or more input pulses corresponding to one or more input periods respectively, the first input pulse corresponding to a first input period, the first input period being after the one or more input periods. The drive signal is associated with one or more modulation periods and a first modulation period, the one or more modulation periods corresponding to the one or more input periods respectively, the first modulation period corresponding to the first input period. The one or more input pulses are associated with one or more pulse widths respectively. The process-and-drive component is further configured to: process information associated with the one or more pulse widths; select a first smallest pulse width from the one or more pulse widths; determine a first duration of the first modulation period based on at least information associated with the first smallest pulse width; and change the drive signal between a first logic level and a second logic level at a modulation frequency during the first modulation period. For example, the apparatus is implemented according to at least FIG. 7 and/or FIG. 9.

According to yet another embodiment, an apparatus for a power conversion system includes: a process-and-drive component configured to receive an input signal associated with a TRIAC dimmer and output a drive signal to a switch to affect a current that flows through a primary winding of a power conversion system. The input signal includes a first pulse corresponding to a first input period, the first pulse being associated with a first pulse width. The first pulse width is larger than a first threshold for normal operation of the TRIAC dimmer. The process-and-drive component is further configured to: process information associated with the first pulse width and a second threshold, the second threshold being larger than the first threshold, and in response to the first pulse width being smaller than the second threshold, even if the first pulse width is still larger than the first threshold, maintain the drive signal at a first logic level without modulation to keep the switch open during at least the first input period. For example, the apparatus is implemented according to at least FIG. 7 and/or FIG. 14.

In one embodiment, an apparatus for a power conversion system includes: a process-and-drive component configured to receive an input signal and output a drive signal to a switch to affect a current that flows through one or more light emitting diodes, the one or more light emitting diodes being associated with a secondary winding of a power conversion system. The input signal includes a pulse associated with a pulse width. The process-and-drive component is further configured to: process information associated with the pulse width; and generate the drive signal based on at least information associated with the pulse width so that the current changes non-linearly with the pulse width but a brightness of the one or more light emitting diodes changes linearly with the pulse width. For example, the apparatus is implemented according to at least FIG. 7 and/or FIG. 15(C).

In another embodiment, a method for a power conversion system includes: receiving an input signal including a first pulse associated with a first input period and a second pulse associated with a second input period; processing information associated with the input signal; and outputting a drive signal to a switch to affect a current that flows through a primary winding of a power conversion system, the drive signal being associated with a first modulation period for the first input period and a second modulation period for the second input period. The processing information associated with the input signal includes: determining the first modulation period for the first input period; and determining the second modulation period for the second input period. The outputting a drive signal to a switch to affect a current that flows through a primary winding of a power conversion system includes: changing the drive signal between a first logic level and a second logic level at a modulation frequency during the first modulation period; and changing the drive signal between the first logic level and the second logic level at the modulation frequency during the second modulation period. The first pulse corresponds to a first pulse width. The second pulse corresponds to a second pulse width. The first modulation period corresponds to a first duration. The second modulation period corresponds to a second duration. The first pulse width and the second pulse width are different in magnitude. The first duration and the second duration are equal in magnitude. For example, the method is implemented according to at least FIG. 8.

In yet another example, a method for a power conversion system includes: receiving an input signal, the input signal including one or more input pulses and a first input pulse, the one or more input pulses corresponding to one or more input periods respectively, the first input pulse corresponding to a first input period, the first input period being after the one or more input periods; processing information associated with the input signal; and outputting a drive signal to a switch to affect a current that flows through a primary winding of a power conversion system, the drive signal being associated with one or more modulation periods and a first modulation period. The one or more modulation periods correspond to the one or more input periods respectively. The first modulation period corresponds to the first input period. The one or more input pulses are associated with one or more pulse widths respectively. The processing information associated with the input signal includes: processing information associated with the one or more pulse widths; selecting a first smallest pulse width from the one or more pulse widths; and determining a first duration of the first modulation period based on at least information associated with the first smallest pulse width. The outputting a drive signal to a switch to affect a current that flows through a primary winding of a power conversion system includes changing the drive signal between a first logic level and a second logic level at a modulation frequency during the first modulation period. For example, the method is implemented according to at least FIG. 9.

According to one embodiment, a method for a power conversion system includes: receiving an input signal associated with a TRIAC dimmer, the input signal including a first pulse corresponding to a first input period, the first pulse being associated with a first pulse width, the first pulse width being larger than a first threshold for normal operation of the TRIAC dimmer; processing information associated with the input signal; and outputting a drive signal to a switch to affect a current that flows through a primary winding of a power conversion system. The processing information associated with the input signal includes processing information associated with the first pulse width and a second threshold, the second threshold being larger than the first threshold. The outputting a drive signal to a switch to affect a current that flows through a primary winding of a power conversion system includes, in response to the first pulse width being smaller than the second threshold, even if the first pulse width is still larger than the first threshold, maintaining the drive signal at a first logic level without modulation to keep the switch open during at least the first input period. For example, the method is implemented according to at least FIG. 14.

According to another embodiment, a method for a power conversion system includes: receiving an input signal including a pulse associated with a pulse width; processing information associated with the input signal; and outputting a drive signal to a switch to affect a current that flows through one or more light emitting diodes, the one or more light emitting diodes being associated with a secondary winding of a power conversion system. The processing information associated with the input signal includes processing information associated with the pulse width. The outputting a drive signal to a switch to affect a current that flows through one or more light emitting diodes includes generating the drive signal based on at least information associated with the pulse width so that the current changes non-linearly with the pulse width but a brightness of the one or more light emitting diodes changes linearly with the pulse width. For example, the method is implemented according to at least FIG. 15(C).

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus for a power conversion system, the apparatus comprising:
a process-and-drive component configured to receive an input signal associated with a TRIAC dimmer and output a drive signal to a switch to affect a current that flows through a primary winding of a power conversion system;
wherein:
the input signal includes a first pulse corresponding to a first input period, the first pulse being associated with a first pulse width; and
the first pulse width is larger than a first threshold for normal operation of the TRIAC dimmer;
wherein the process-and-drive component is further configured to:
process information associated with the first pulse width and a second threshold, the second threshold being larger than the first threshold; and
in response to the first pulse width being smaller than the second threshold, even if the first pulse width is still larger than the first threshold, maintain the drive signal at a first logic level without modulation to keep the switch open during at least the first input period.

2. The apparatus of claim 1 wherein the TRIAC dimmer is incapable of generating, with a rectifying bridge, a second pulse, the second pulse being associated with a second pulse width smaller than the first threshold.

3. The apparatus of claim 1 wherein the TRIAC dimmer is configured to generate, with a rectifying bridge, a second pulse associated with a second pulse width larger than the first threshold.

4. The apparatus of claim 1 wherein the process-and-drive component is further configured to provide a bleeding current to the TRIAC dimmer for the normal operation of the TRIAC dimmer so that an output current of the power conversion system does not change rapidly over a range of pulse widths for the input signal.

5. The apparatus of claim 1, further comprising:
a reference signal generator configured to receive the input signal and generate a reference signal based on at least information associated with the input signal;
an error amplifier configured to receive the reference signal and a current sensing signal and generate an amplified signal based on at least information associated with the reference signal and the current sensing signal;
a modulation component configured to generate a modulation signal based on at least information associated with the amplified signal; and
a drive component configured to generate the drive signal based on at least information associated with the modulation signal.

6. The apparatus of claim 5, wherein the reference signal generator includes:
a first logic control component configured to receive the input signal and generate a first signal based on at least information associated with the input signal; and
a reference signal modulator configured to receive the first signal and change the reference signal based on at least information associated with the first signal.

7. The apparatus of claim 6 wherein the drive component includes:
a second logic control component configured to receive the modulation signal and a dimming signal generated by the first logic control component and generate a second signal based on at least information associated with the modulation signal and the dimming signal; and
a gate driver configured to generate the drive signal based on at least information associated with the second signal.

8. The apparatus of claim 5 wherein the modulation component includes:
a multiplier configured to receive the amplified signal and the input signal and generate a multiplied signal based on at least information associated with the amplified signal and the input signal; and
a modulator configured to receive the multiplied signal and the current sensing signal and generate the modulation signal based on at least information associated with the multiplied signal and the current sensing signal.

9. The apparatus of claim 5 wherein the error amplifier is further configured to generate the amplified signal with a capacitor.

10. The apparatus of claim 1 wherein the process-and-drive component is further configured to, in response to the first pulse width being equal to or smaller than the second threshold, maintain the drive signal at the first logic level without modulation to keep the switch open to decrease an output current of the power conversion system.

11. The apparatus of claim 1 wherein:
the first pulse width corresponds to a phase angle associated with the first input period;
the phase angle is larger than a third threshold for normal operation of the TRIAC dimmer; and
the process-and-drive component is further configured to:
process information associated with the phase angle and a fourth threshold, the fourth threshold being larger than the third threshold; and
in response to the phase angle being smaller than the fourth threshold, even if the phase angle is still larger than the third threshold, maintain the drive signal at the first logic level without modulation to keep the switch open during at least the first input period.

12. A method for a power conversion system, the method comprising:
receiving an input signal associated with a TRIAC dimmer, the input signal including a first pulse corresponding to a first input period, the first pulse being associated with a first pulse width, the first pulse width being larger than a first threshold for normal operation of the TRIAC dimmer;
processing information associated with the input signal; and
outputting a drive signal to a switch to affect a current that flows through a primary winding of a power conversion system;
wherein the processing information associated with the input signal includes processing information associated with the first pulse width and a second threshold, the second threshold being larger than the first threshold; and
wherein the outputting a drive signal to a switch to affect a current that flows through a primary winding of a power conversion system includes, in response to the first pulse width being smaller than the second threshold, even if the first pulse width is still larger than the first threshold, maintaining the drive signal at a first logic level without modulation to keep the switch open during at least the first input period.

* * * * *